US012651930B2

(12) United States Patent
Mitomo et al.

(10) Patent No.: US 12,651,930 B2
(45) Date of Patent: Jun. 9, 2026

(54) POWER FEEDING SYSTEM, POWER FEEDING APPARATUS, POWER FEEDING METHOD, AND STORAGE MEDIUM

(71) Applicant: KABUSHIKI KAISHA TOSHIBA, Tokyo (JP)

(72) Inventors: Toshiya Mitomo, Yokohama Kanagawa (JP); Kentaro Taniguchi, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 5 days.

(21) Appl. No.: 18/801,857

(22) Filed: Aug. 13, 2024

(65) Prior Publication Data

US 2025/0202287 A1 Jun. 19, 2025

(30) Foreign Application Priority Data

Dec. 19, 2023 (JP) ................................. 2023-213815

(51) Int. Cl.
*H02J 50/40* (2016.01)
*H02J 50/20* (2016.01)
*H02J 50/80* (2016.01)

(52) U.S. Cl.
CPC .............. *H02J 50/40* (2016.02); *H02J 50/20* (2016.02); *H02J 50/80* (2016.02)

(58) Field of Classification Search
CPC ............. H02J 50/40; H02J 50/20; H02J 50/80
See application file for complete search history.

(56) References Cited

U.S. PATENT DOCUMENTS

| | | | | |
|---|---|---|---|---|
| 8,135,347 B2 * | 3/2012 | Ohkita | .................. | H04L 67/143 |
| | | | | 455/41.2 |
| 8,406,249 B2 * | 3/2013 | Horisaki | ............... | H04L 12/413 |
| | | | | 370/454 |
| 8,989,653 B2 * | 3/2015 | Horiguchi | ................ | H04B 5/24 |
| | | | | 455/343.5 |
| 2007/0183392 A1 * | 8/2007 | Tandai | .................. | H04W 16/14 |
| | | | | 370/350 |
| 2013/0049481 A1 * | 2/2013 | Kudo | ...................... | H02J 50/80 |
| | | | | 307/104 |
| 2013/0324038 A1 * | 12/2013 | Kajihara | .................. | H04B 5/24 |
| | | | | 455/41.1 |
| 2017/0257188 A1 * | 9/2017 | Taniguchi | ............. | H04L 1/1864 |
| 2024/0039343 A1 * | 2/2024 | Mitomo | .................. | H04B 5/79 |

FOREIGN PATENT DOCUMENTS

JP 2021170919 A * 10/2021

* cited by examiner

*Primary Examiner* — Rexford N Barnie
*Assistant Examiner* — Michael J Warmflash
(74) *Attorney, Agent, or Firm* — Holtz, Holtz & Volek PC

(57) ABSTRACT

According to one embodiment, a power feeding system includes power receiving units, communication units, and a power feeding unit. The power feeding unit is configured to stop feeding power to a first power receiving unit when the receiving level is lower than a first reference value, feed power to a second power receiving unit, stop feeding power to the second power receiving unit, and resume feeding power to the first power receiving unit.

19 Claims, 16 Drawing Sheets

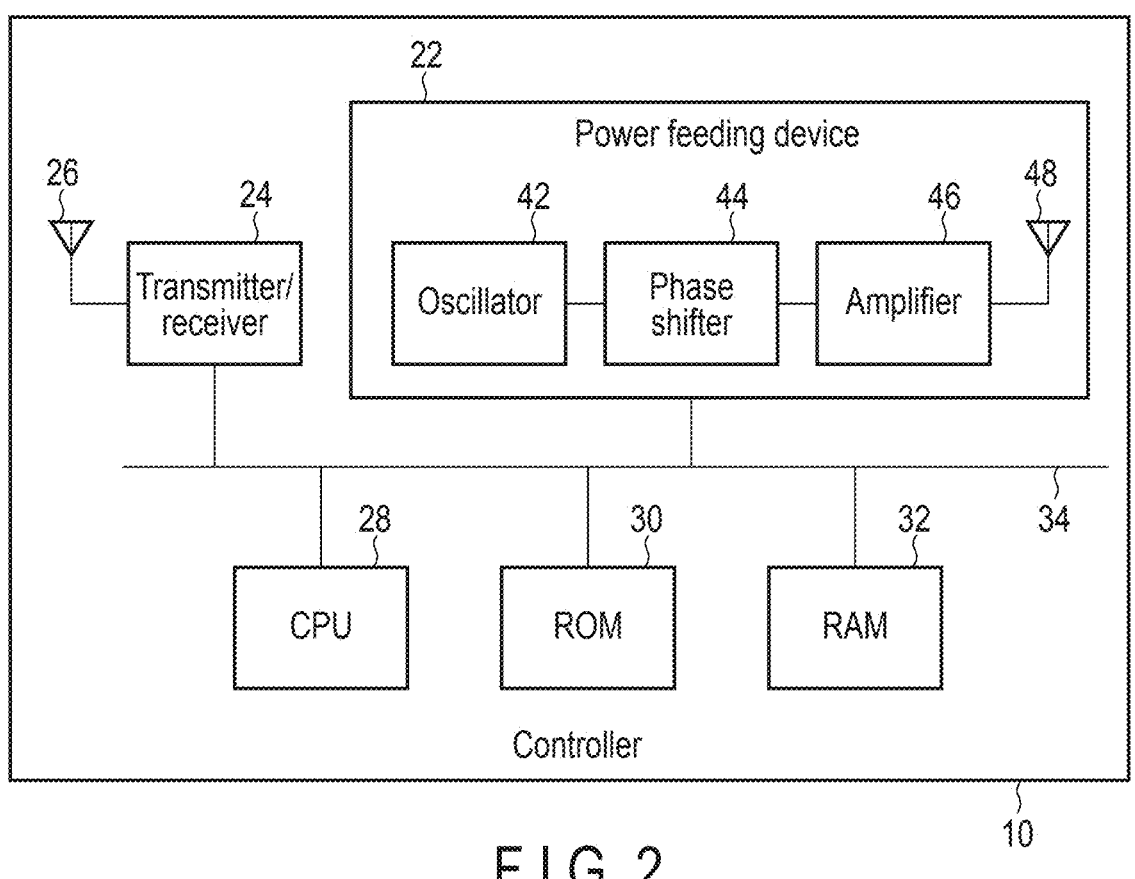
F I G. 2
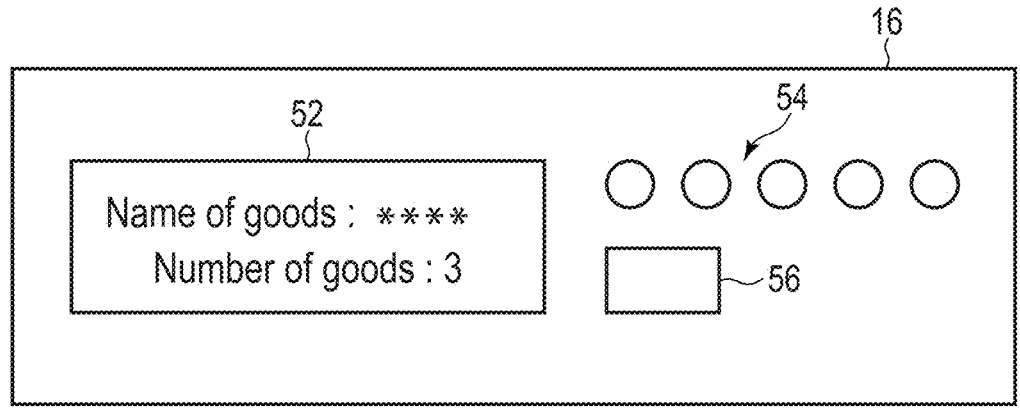
F I G. 3

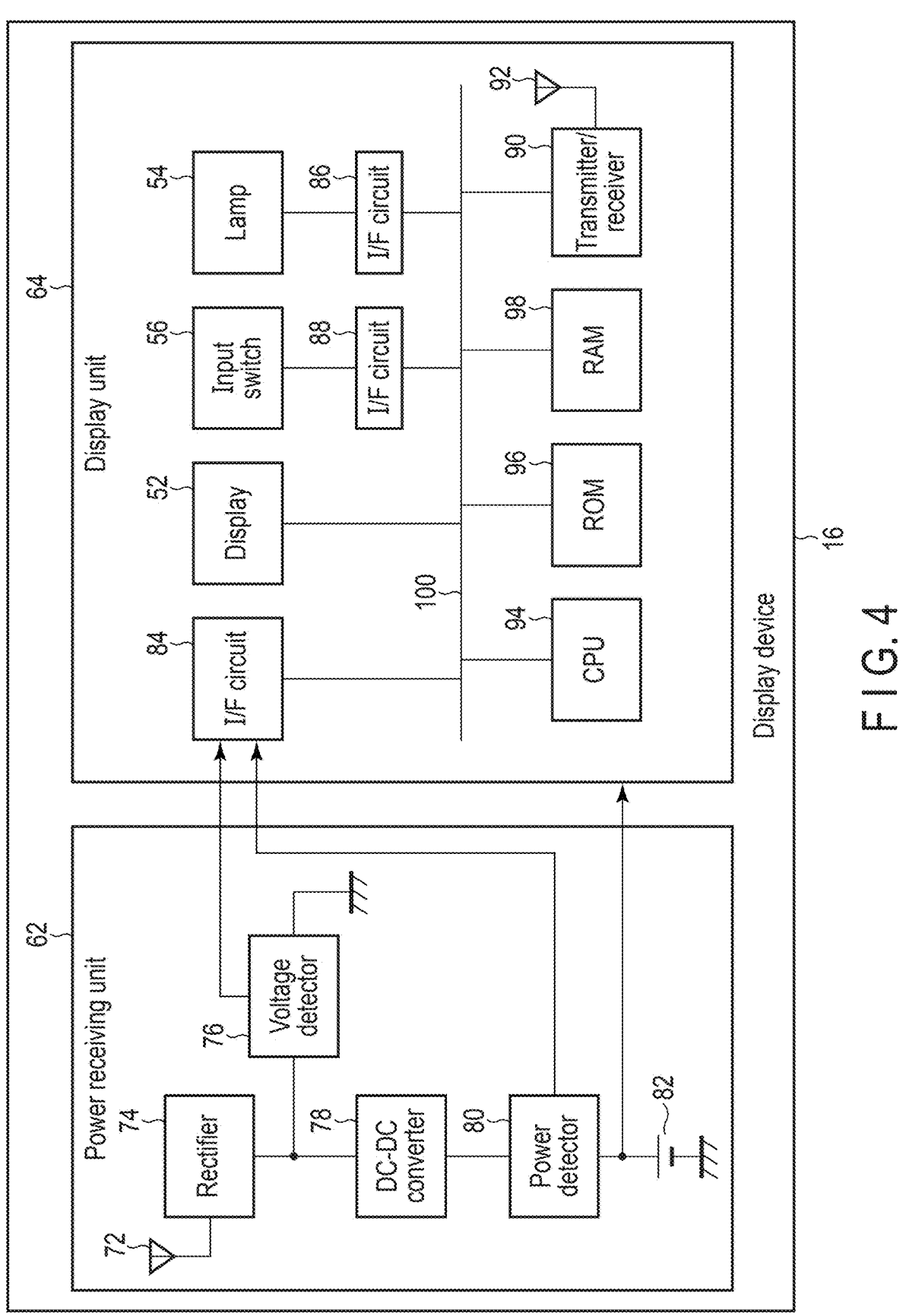
F I G. 4

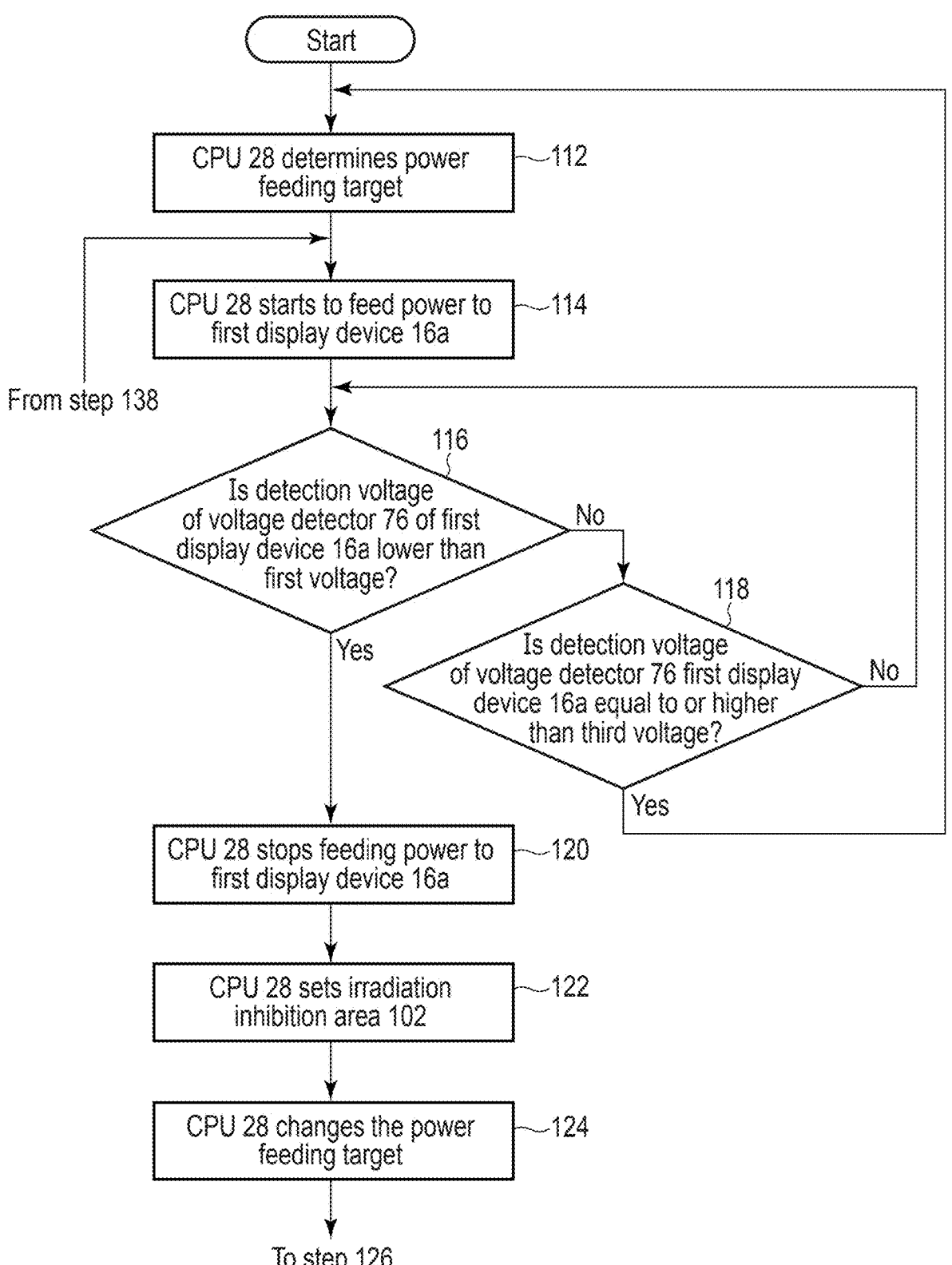
F I G. 5

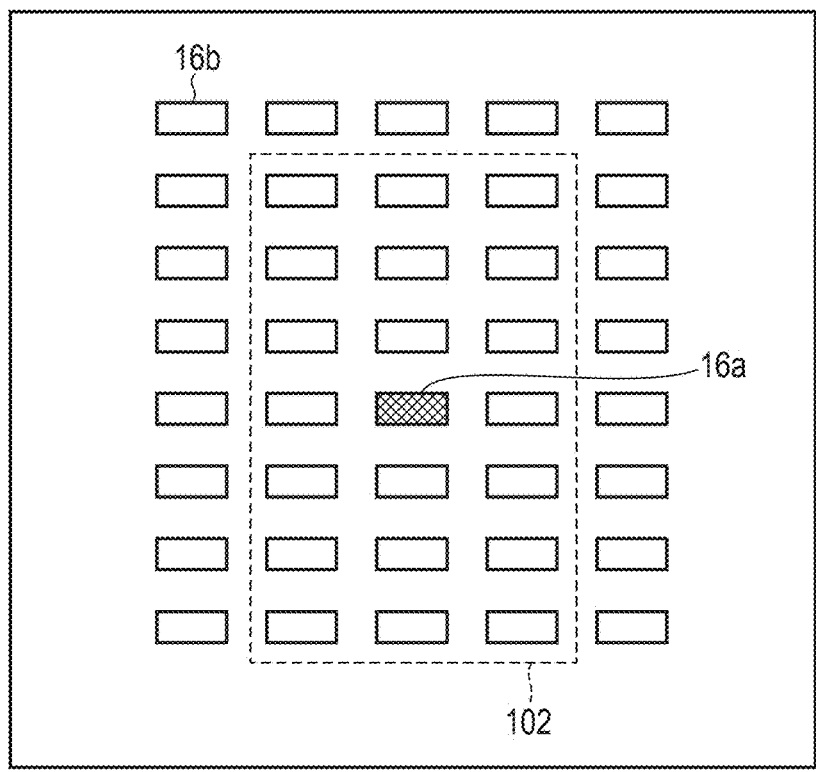
F I G. 7
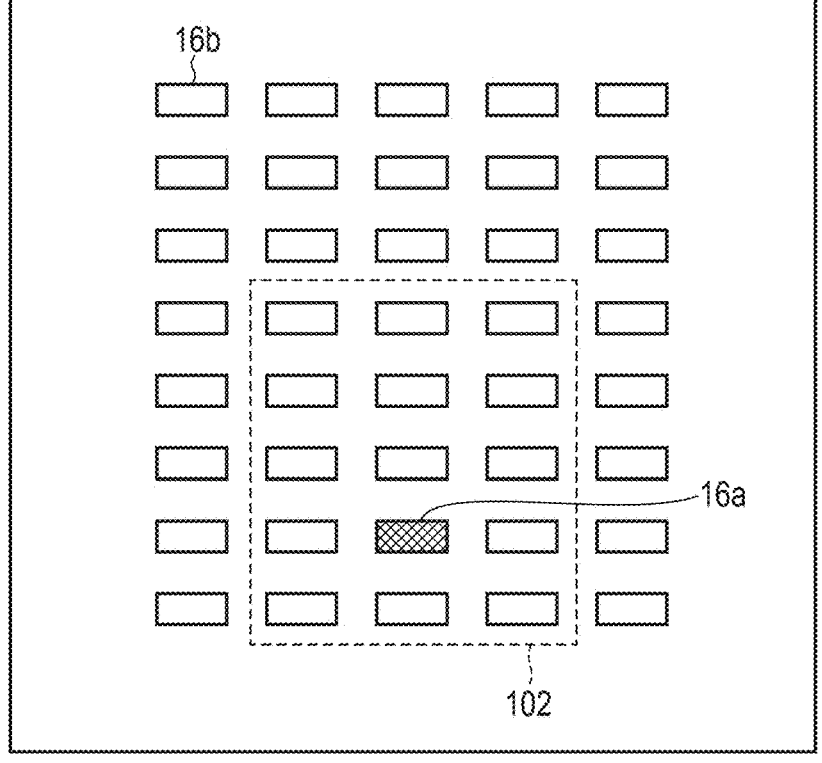
F I G. 8

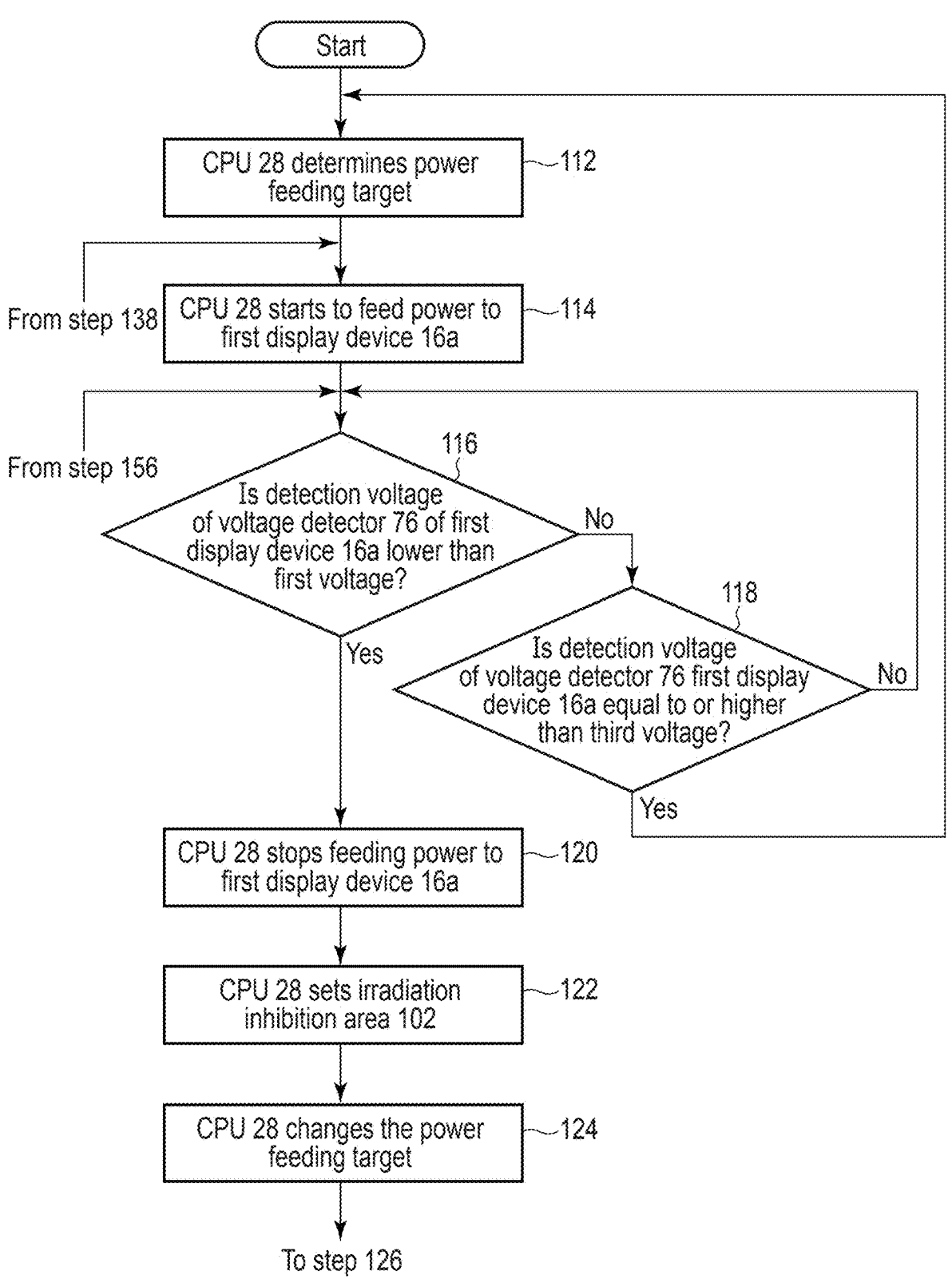
F I G. 9

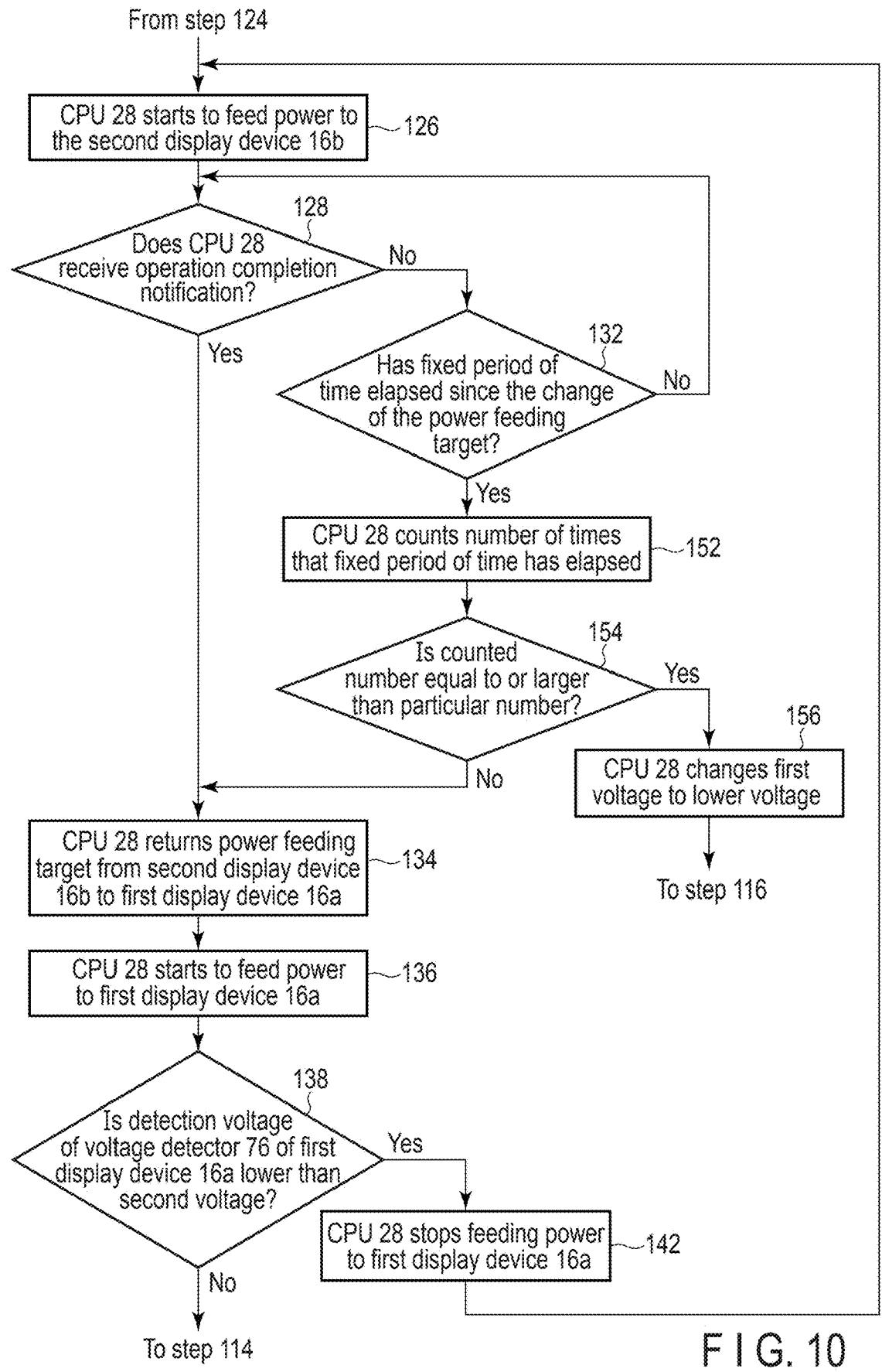
F I G. 10

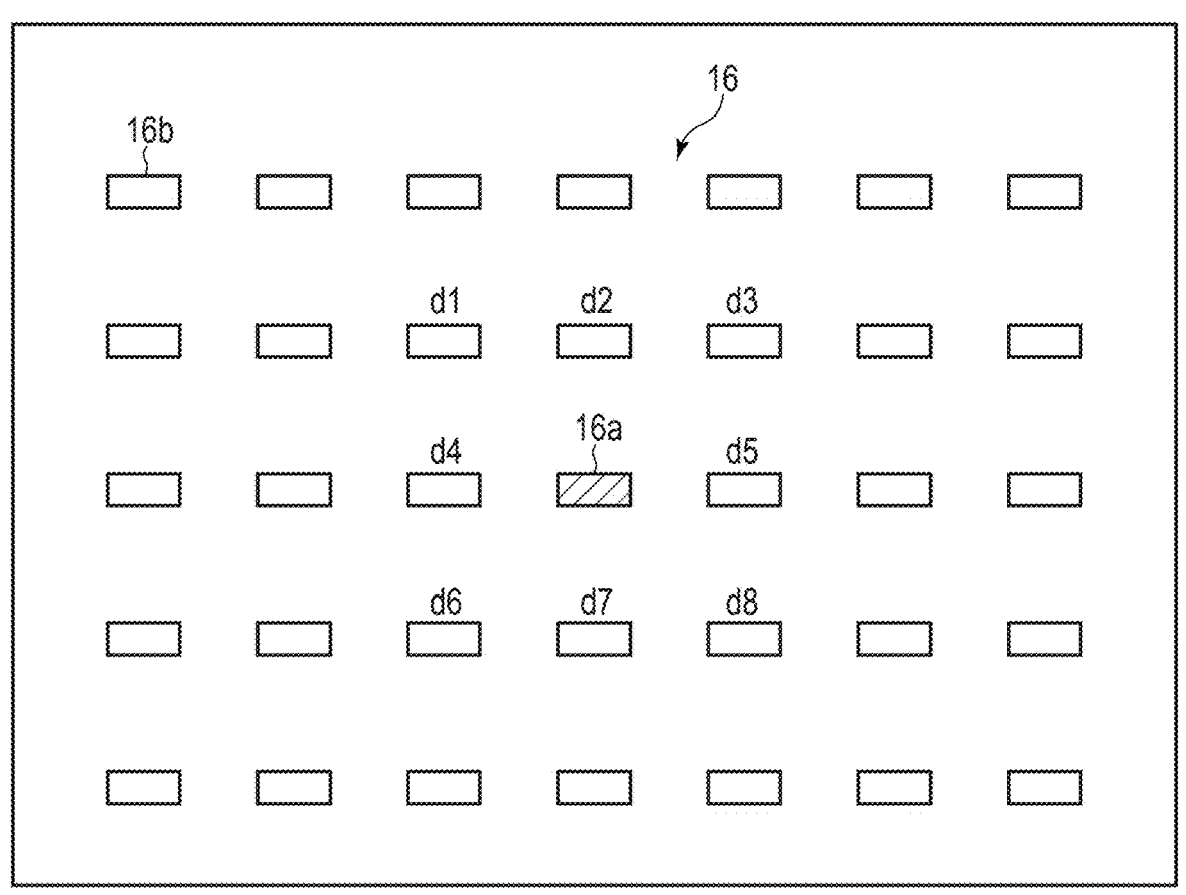
F I G. 11
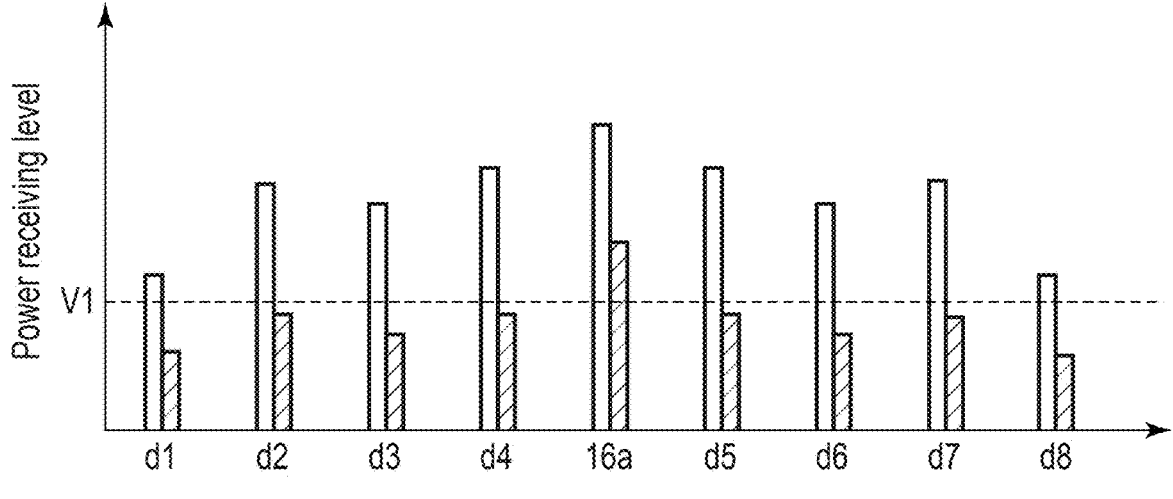
F I G. 12

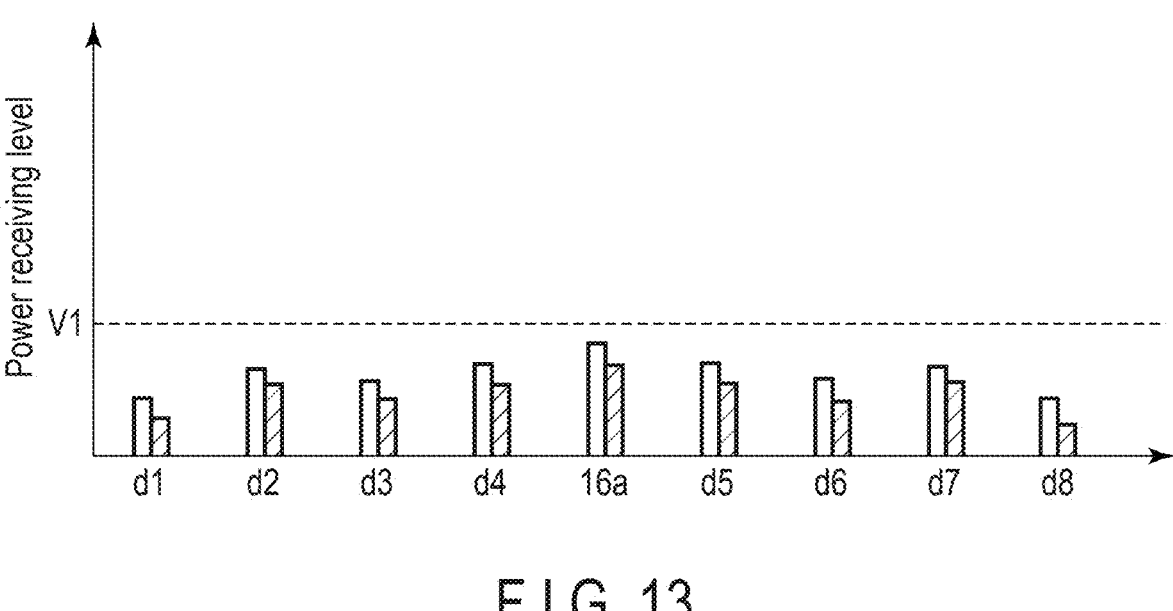
F I G. 13
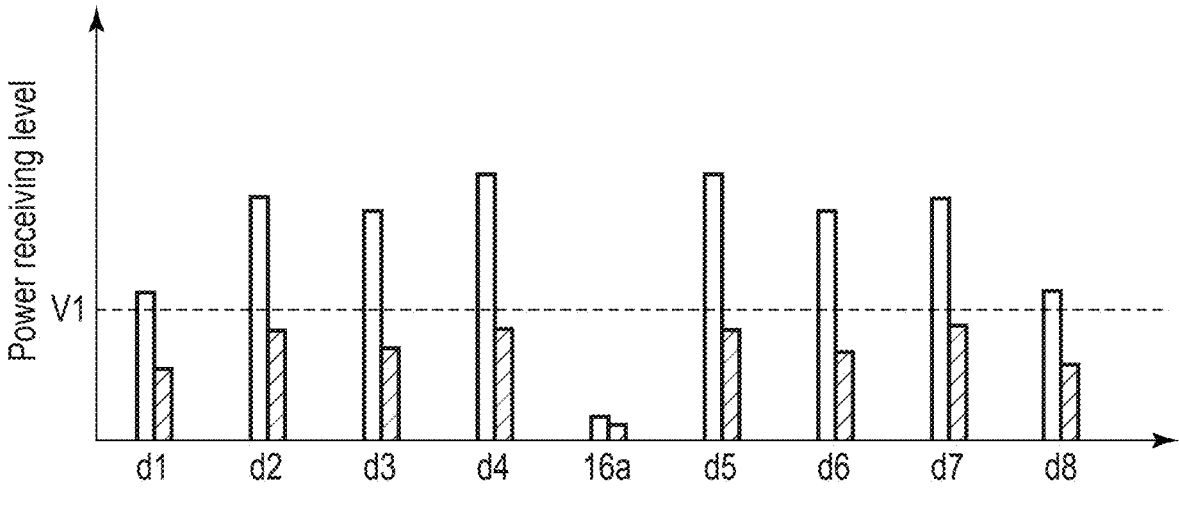
F I G. 14

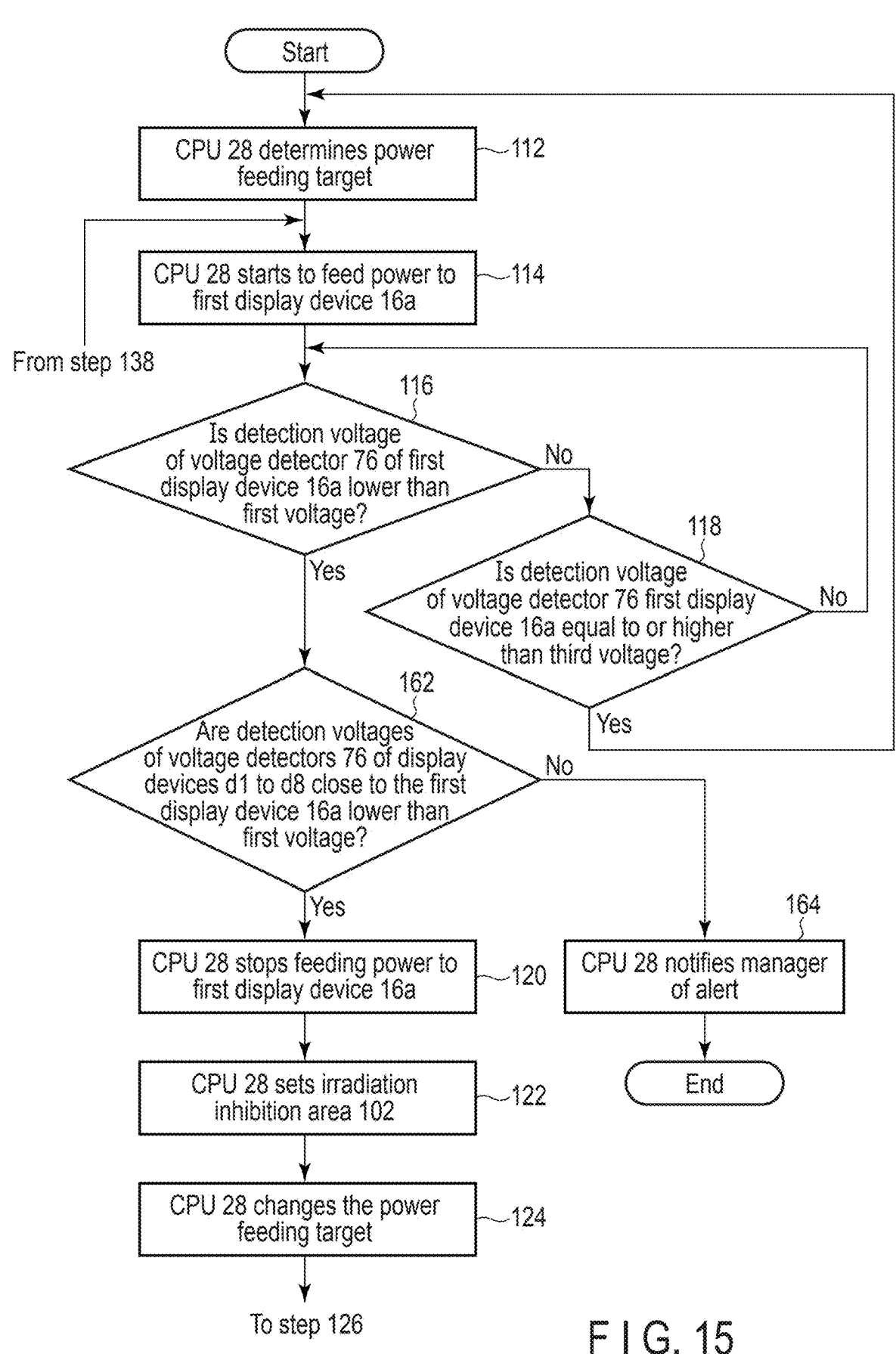
F I G. 15

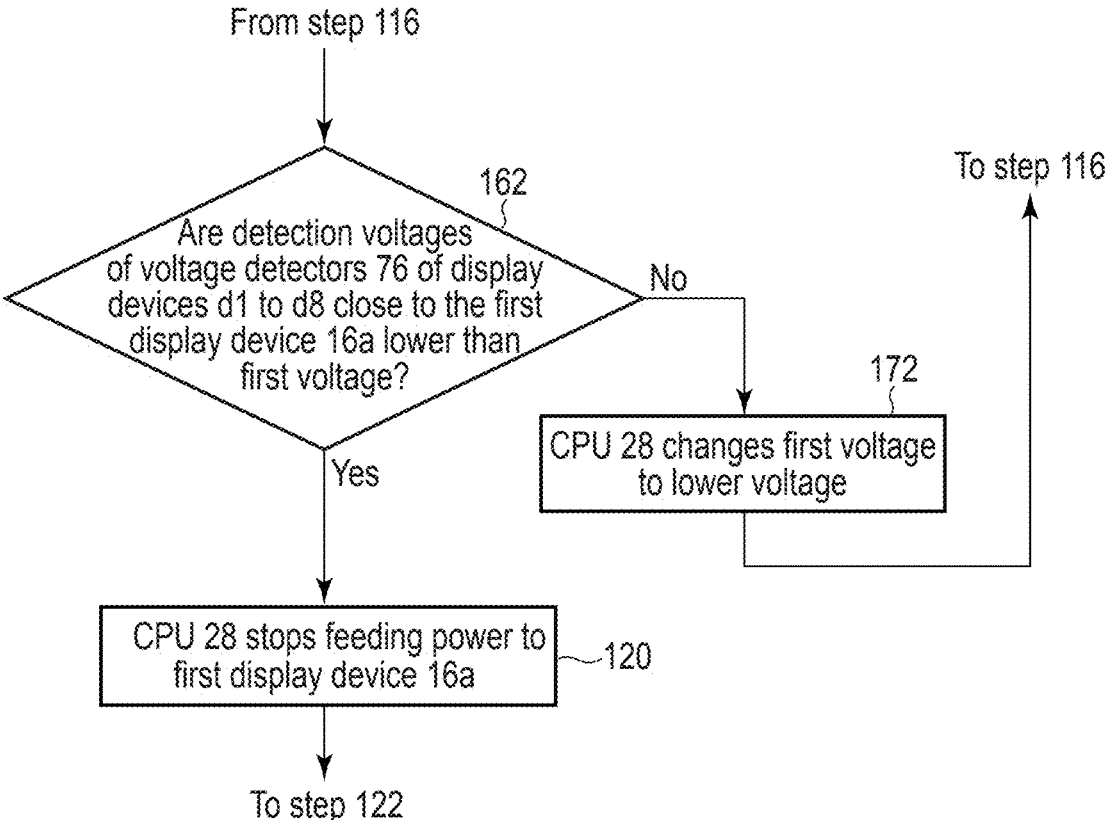
F I G. 16

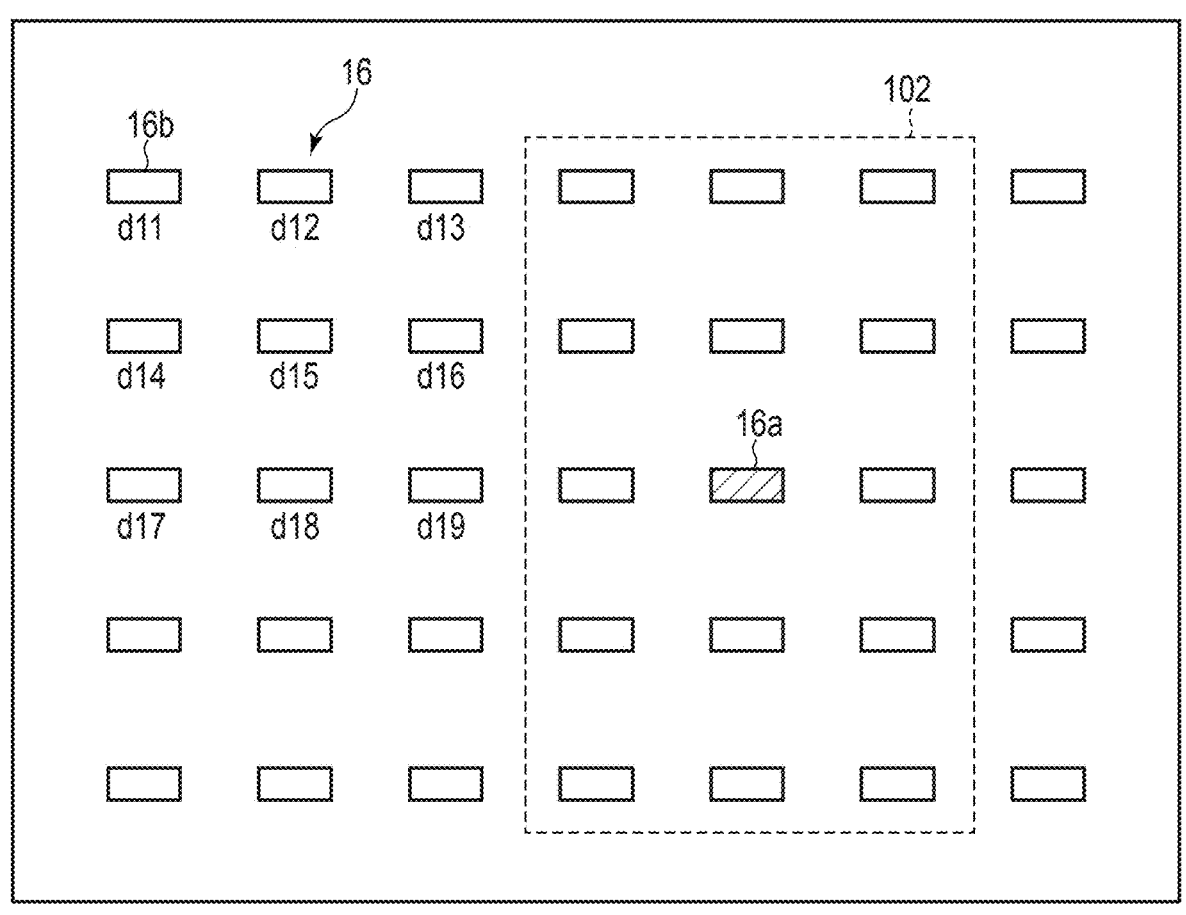
F I G. 17
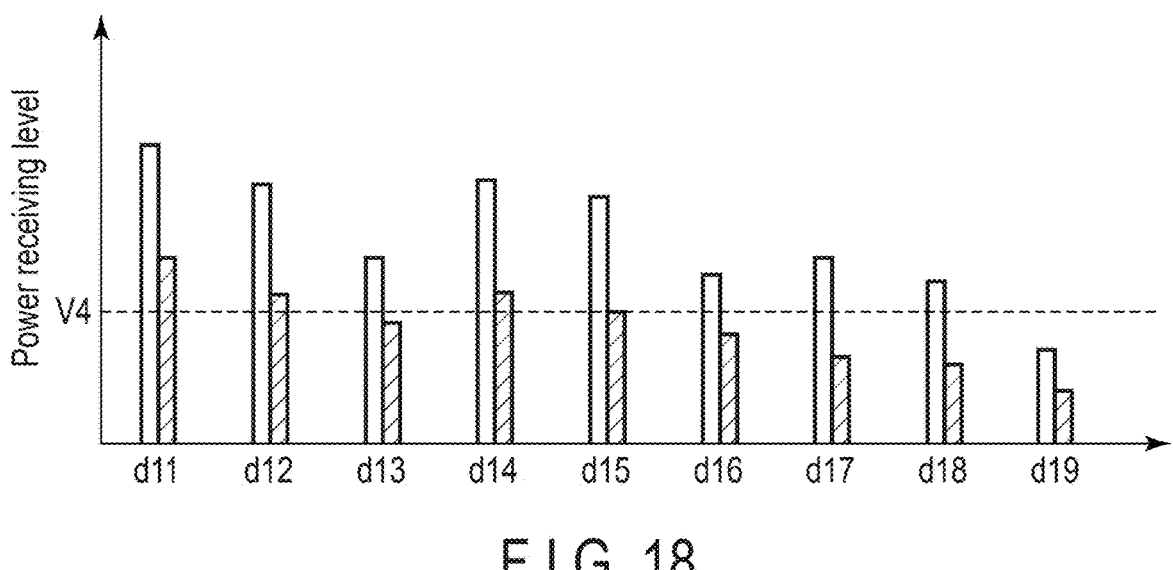
F I G. 18

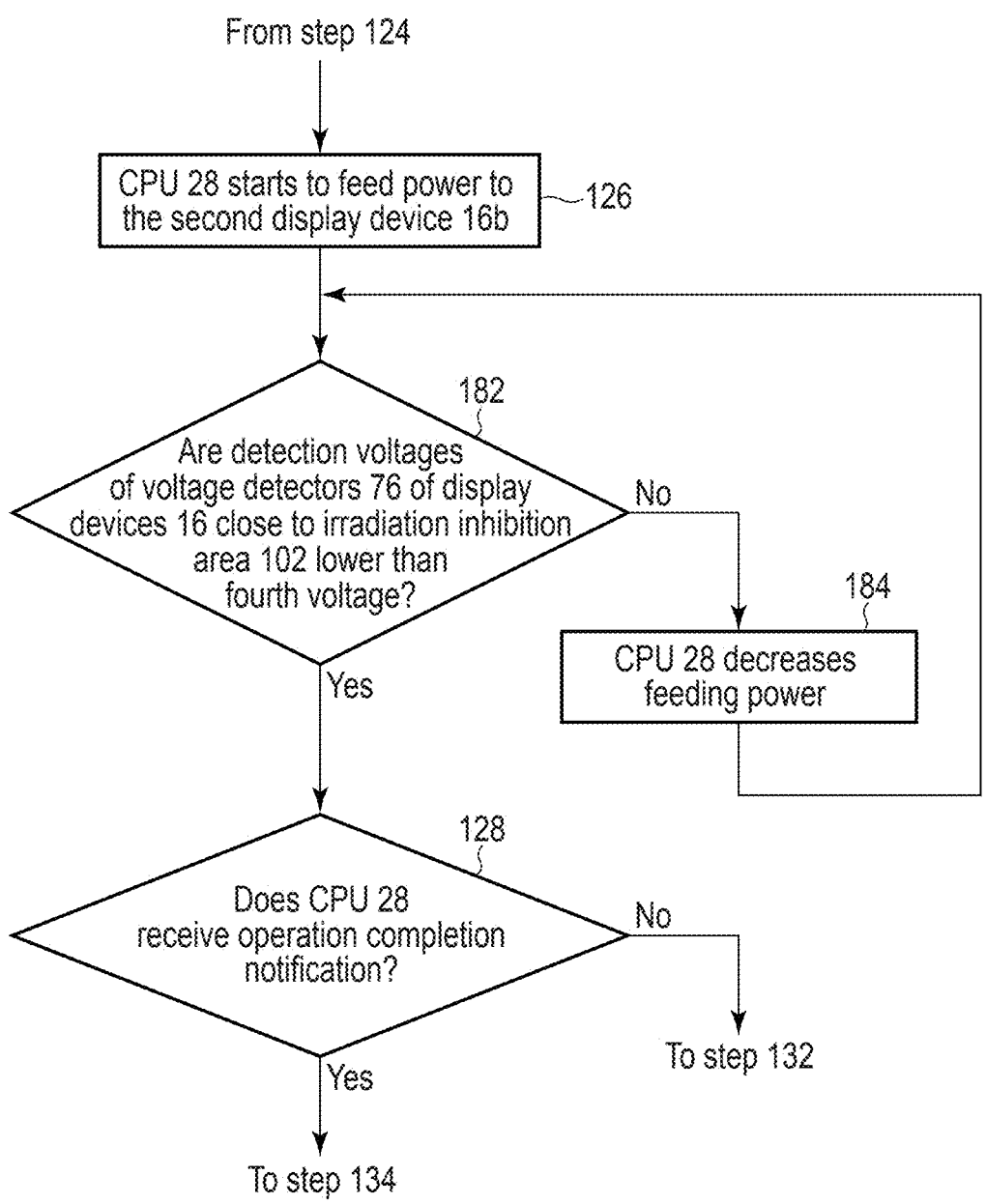
F I G. 19

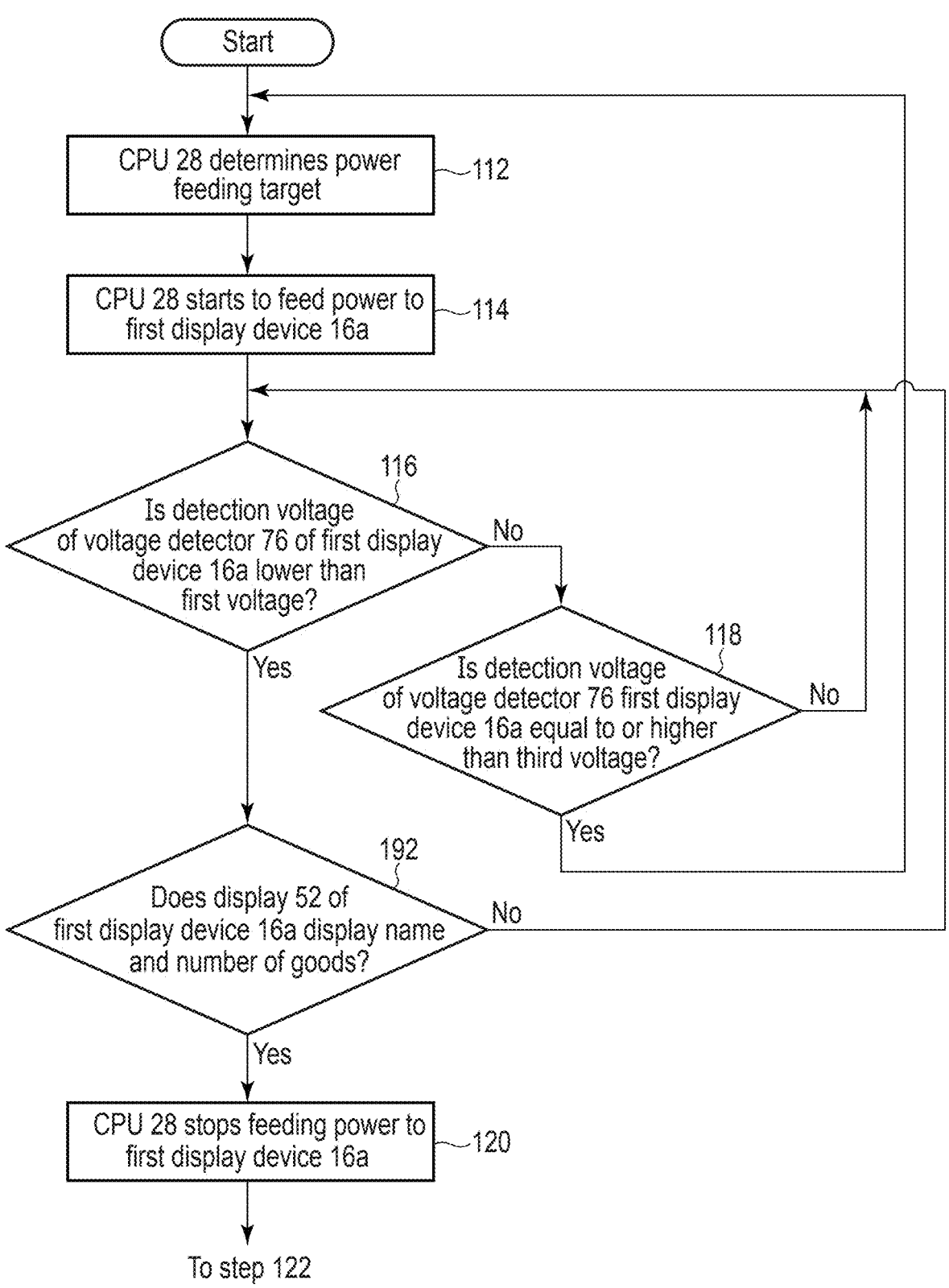
F I G. 20

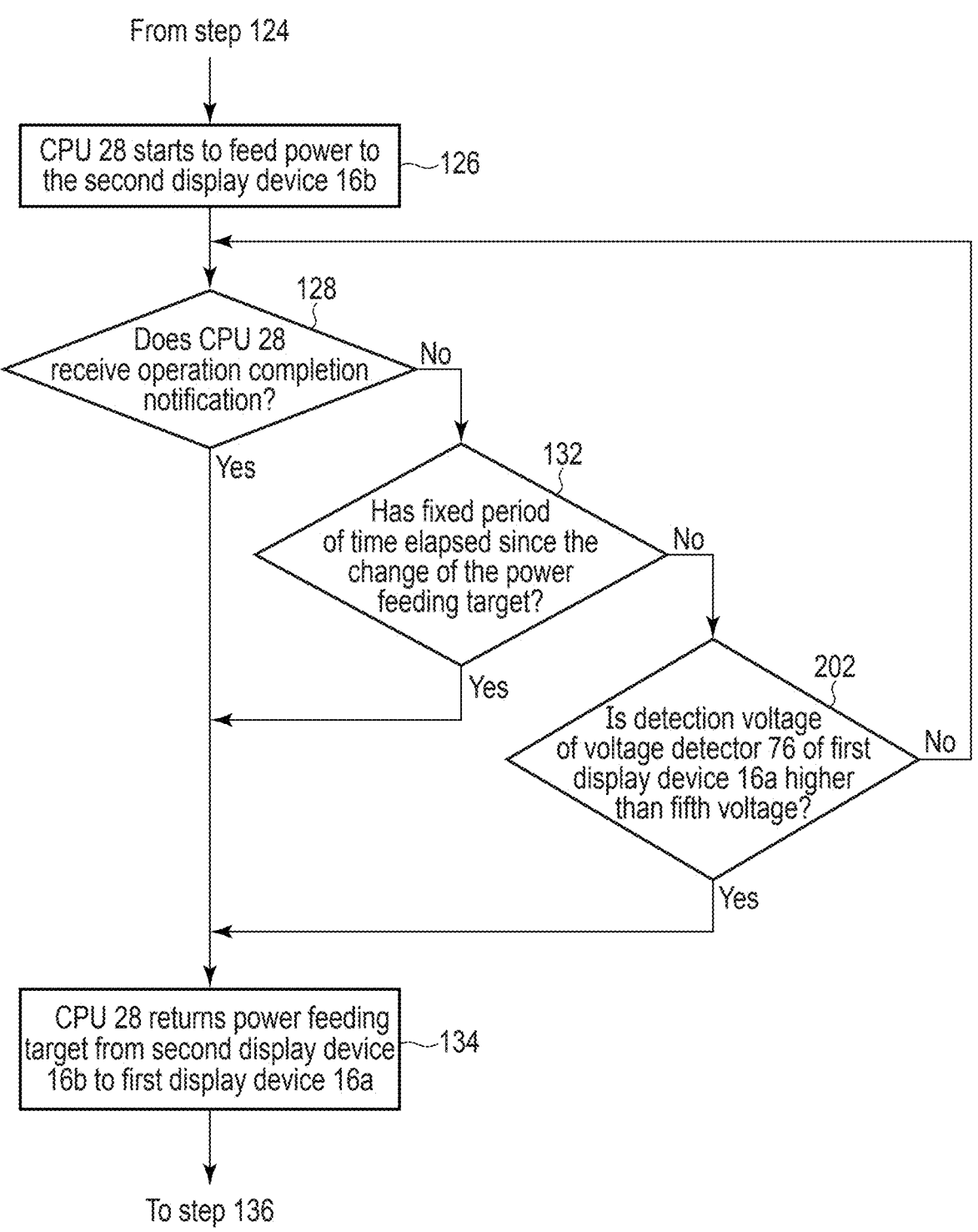
F I G. 21

POWER FEEDING SYSTEM, POWER FEEDING APPARATUS, POWER FEEDING METHOD, AND STORAGE MEDIUM

CROSS-REFERENCE TO RELATED APPLICATIONS

This application is based upon and claims the benefit of priority from Japanese Patent Application No. 2023-213815, filed Dec. 19, 2023, the entire contents of which are incorporated herein by reference.

FIELD

Embodiments described herein relate generally to a power feeding system, power feeding apparatus, power feeding method, and storage medium.

BACKGROUND

There is a picking support system as an application example of a power feeding apparatus that feeds electric power wirelessly to an electronic device. The picking support system includes a plurality of display devices, a host device connected to the display devices, and a power feeding device connected to the same. The display devices are installed at positions of goods placed and stored on a shelf. The host device transmits to the display devices information indicating goods to be picked out by a worker. The display devices display the information. The display devices each include a secondary battery. The power feeding apparatus feeds power to the display devices by electromagnetic waves. The secondary battery is charged with the power.

The worker picks goods out of the shelf in response to the display on the display devices. Preferably, the worker should not be irradiated with electric waves for feeding power from the power feeding apparatus. However, depending on the contents of works, a worker may stand is in front of the display device to which power is being fed.

A conventional power feeding apparatus stops its power feeding if it senses the presence of a worker. This prevents worker's health from being damaged, but the secondary battery of the display device may be underpowered.

BRIEF DESCRIPTION OF THE DRAWINGS

FIG. 2 is a block diagram illustrating an example of a controller according to the first embodiment.

FIG. 3 is a front view illustrating an example of a display device according to the first embodiment.

FIG. 4 is a block diagram illustrating an example of the display device according to the first embodiment.

FIG. 5 shows a flowchart of the controller according to the first embodiment.

FIG. 7 is a front view of a shelf according to the first embodiment.

FIG. 8 is a front views of the shelf according to the first embodiment.

FIG. 9 shows a flowchart of the controller according to a second embodiment.

FIG. 10 shows a flowchart of the controller according to the second embodiment.

FIG. 11 is a front view of the shelf according to a third embodiment.

FIG. 12 is a graph illustrating an example of the power receiving level according to the third embodiment.

FIG. 13 is a graph illustrating another example of a power receiving level according to the third embodiment.

FIG. 14 is a graph illustrating still another example of the power receiving level according to the third embodiment.

FIG. 15 is a flowchart of the controller according to the third embodiment.

FIG. 16 is a flowchart of the controller according to the third embodiment.

FIG. 17 is a front view of the shelf according to a fourth embodiment.

FIG. 18 is a graph illustrating an example of the power receiving level according to the fourth embodiment.

FIG. 19 is a flowchart of the controller according to the fourth embodiment.

FIG. 20 is a flowchart of the controller according to a fifth embodiment.

FIG. 21 is a flowchart of the controller according to a sixth embodiment.

DETAILED DESCRIPTION

Figure 1:
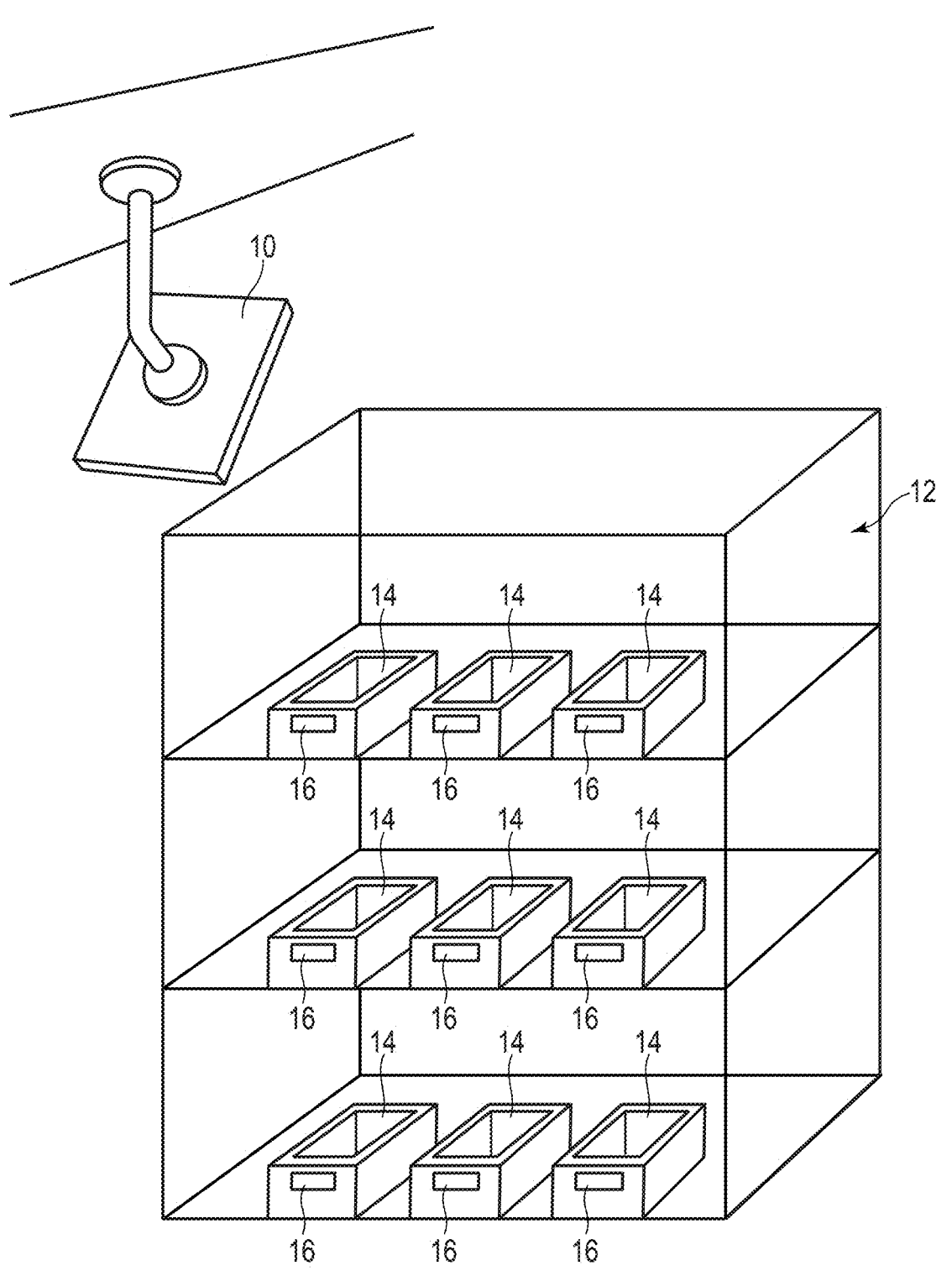
FIG. 1 is a perspective view illustrating an example of a power feeding system according to a first embodiment.

Embodiments will be described below with reference to the drawings. In the following descriptions, a device and a method are shown to embody the technical concept of the embodiments. The technical concept is not limited to the configuration, shape, arrangement, material or the like of the structural elements described below. Modifications that could easily be conceived by a person with ordinary skill in the art are naturally included in the scope of the disclosure. To make the descriptions clearer, the drawings may schematically show the size, thickness, planer dimension, shape, and the like of each element differently from those in the actual aspect. The drawings may include elements that differ in dimension and ratio. Elements corresponding to each other are denoted by the same reference numeral and their overlapping descriptions may be omitted. Some elements may be denoted by different names, and these names are merely an example. It should not be denied that one element is denoted by different names. Note that "connection" means that one element is connected to another element via still another element as well as that one element is directly connected to another element. If the number of elements is not specified as plural, the elements may be singular or plural.

In general, according to one embodiment, a power feeding system comprises power receiving units configured to receive electromagnetic waves, communication units corresponding to the power receiving units, and a power feeding unit configured to feed power to a first power receiving unit included in the power receiving units via the electromagnetic waves. The communication units include a first communication unit corresponding to the first power receiving unit. The first communication unit is configured to transmit reception information representing a receiving level of the first power receiving unit to the power feeding unit. The power feeding unit is configured to stop feeding power to the first power receiving unit when the receiving level is lower than a first reference value, feed power to a second power receiving unit other than the first power receiving unit, stop feeding power to the second power receiving unit, and resume feeding power to the first power receiving unit.

First Embodiment

FIG. 1 is a perspective view illustrating an example of a power feeding system according to a first embodiment. FIG.

1 shows an example of a power feeding system applied to a picking support system. The power feeding system includes a controller 10 and a plurality of display devices 16.

A shelf 12 is installed in a warehouse to store goods. The controller 10 is placed close to the shelf 12. The controller 10 may be placed on the top of the shelf 12. The controller 10 has a power feeding function of feeding power to the display devices 16 and a control function of controlling the display devices 16. The controller 10 may be separated into a controller having a function of feeding power to the display devices 16 and a controller having a function of controlling the display devices 16. The controller 10 is not placed on the shelf 12 but may be placed close to the shelf 12, e.g., at a ceiling of the warehouse.

A plurality of containers 14 for storing goods are located in the shelf 12. The containers 14 are prepared for their respective goods. The containers 14 are each provided with a display device 16. The display device 16 is wirelessly connected to the controller 10. The display device 16 displays information for supporting the picking operation of a worker in response to an instruction from the controller 10. The display device 16 is not connected to a commercial power supply but includes a secondary battery. The display device 16 is operated by the power of the secondary battery. The controller 10 wirelessly feeds power to the display device 16. The secondary battery is charged with the power. The display device 16 may not be provided at the container 14 and may be placed on the shelf 12 at the location of the container 14.

FIG. 2 is a block diagram illustrating an example of an electrical configuration of the controller 10 according to the first embodiment. The controller 10 includes a power feeding device 22, a transmitter/receiver 24, a transmitting/receiving antenna 26, a CPU 28, a ROM 30, and a RAM 32. The power feeding device 22, transmitter/receiver 24, CPU 28, ROM 30, and RAM 32 are connected to a bus line 34.

The power feeding device 22 includes an oscillator 42, a phase shifter 44, an amplifier 46, and a power feeding antenna 48. The power feeding antenna 48 is connected to the amplifier 46. The power feeding antenna 48 is an array antenna including a plurality of antenna elements. The phase shifter 44 changes a transmission direction of an antenna beam of the power feeding antenna 48. The amplifier 46 includes a plurality of amplifiers the number of which is equal to that of the antenna elements. The phase shifter 44 also includes a plurality of phase shifters the number of which is equal to that of the antenna elements. The CPU 28 controls the phase shift of each of the phase shifters of the phase shifter 44. The oscillator 42 outputs a high frequency signal such as a frequency signal of a microwave band. The signal output from the oscillator 42 is supplied to each of the antenna element via the phase shifter 44 and the amplifier 46. The phase shifter 44 controls the phase shift of each phase shifter and thus controls a difference in phase between adjacent antenna elements and transmits a power feeding beam to a power feeding target.

The power feeding antenna 48 may be an antenna formed of a single antenna element. In this case, a mechanical scanning mechanism is connected to the power feeding antenna 48. As the direction of the power feeding antenna 48 is mechanically shifted by the scanning mechanism, the beam transmission direction of the power feeding antenna 48 changes and, in this case, the phase shifter 44 is not required. The amplifier 46 is formed of a single amplifier.

The transmitting/receiving antenna 26 is connected to the transmitter/receiver 24. The CPU 28 transmits a control signal to the display device 16 via the transmitter/receiver 24 and the transmitting/receiving antenna 26. The control signal controls the display of the display device 16. The transmitter/receiver 24 receives a notification signal from the display device 16.

The ROM 30 is an example of a computer readable storage medium. The ROM 30 stores a computer program for executing a power feeding process and a picking support process of the controller 10 (referred to as a first picking support program). The first picking support program includes the name and number of goods to be picked out for each worker. The CPU 28 is an example of a computer. The CPU 28 executes the first picking support program to feed power to the display device 16 and transmit a control signal to the display device 16. The CPU 28 transmits the name and number of goods and the ID of a worker to the display device 16 of a container 14 that contains the goods to be picked out by the worker. The CPU 28 also performs a process in response to the notification signal received by the transmitter/receiver 24. The RAM 32 temporarily stores data that is being processed by the CPU 28.

The power feeding device 22 may be built in the housing of the controller 10 or may be located outside the housing and connected to the transmitter/receiver 24, CPU 28, ROM 30, and RAM 32 by wiring.

FIG. 3 is a front view illustrating an example of the display device 16 according to the first embodiment. The display device 16 includes a display 52, an input switch 56, and a plurality of lamps 54. The display device 16 operates based on information transmitted from the controller 10. An example of the display 52 is a liquid crystal panel. The lamps 54 are lamps of different colors. An example of the input switch 56 is a push-button switch.

An example of display of the display 52 is the name and number of goods to be picked out. One of the lamps 54 is turned on. The color of the lamp 54 that is turned on corresponds to the ID of a worker. A combination of two or more of the lamps 54 may be turned on simultaneously. Thus, the lamps 54 can thus be adapted to a number of workers which is larger than the number of the lamps 54. A worker moves to the position of the display device 16 (or the container 14) in which the lamp 54 of the color corresponding to the worker is turned on, and picks from the container 14 the goods the name and number of which are displayed. When the worker completes picking the goods from the container 14, the worker operates the input switch 56 to notify the controller 10 of the completion of the work. Thus, the picking operation is performed with efficiency.

FIG. 4 is a block diagram illustrating an example of an electrical configuration of the display device 16 according to the first embodiment. The display device 16 includes a power receiving unit 62 and a display unit 64. The power receiving unit 62 includes a power receiving antenna 72, a rectifier 74, a voltage detector 76, a DC-DC converter 78, a power detector 80, and a secondary battery 82.

The rectifier 74 rectifies the high-frequency power received by the receiving antenna 72 and converts it into DC power. The voltage detector 76 detects the output voltage of the rectifier 74 and outputs a detection signal representing the detected voltage. The DC-DC converter 78 changes (decreases or increases) the output voltage of the rectifier 74. The output current of the DC-DC converter 78 charges the secondary battery 82. An example of the secondary battery 82 is a lithium-ion battery. The secondary battery 82 is a power supply for the display device 16. The power detector 80 detects the output power of the DC-DC converter 78 and outputs a detection signal representing the detected power. The voltage detector 76 or the power detector 80 may output a detection signal at a fixed period. Alternatively, the voltage detector 76 or the power detector 80 may output a detection signal if a voltage or a power that is lower than a fixed value is detected.

The output signal of the voltage detector 76 and that of the power detector 80 are supplied to the display unit 64 as information indicating the power receiving level of the power receiving unit 62. Since there is a correlation between the output voltage of the rectifier 74 and the output power of the DC-DC converter 78, one of the voltage detector 76 and the power detector 80 may not be provided.

The display unit 64 includes interface (I/F) circuits 84, 86, and 88, the display 52, the lamp 54, the input switch 56, a transmitter/receiver 90, a transmitting/receiving antenna 92, a CPU 94, a ROM 96, and a RAM 98. The I/F circuits 84, 86, and 88, CPU 94, ROM 96, RAM 98, and transmitter/receiver 90 are connected to a bus line 100.

The I/F circuits 84, 86, and 88 are serial interface circuits. An example of the serial interface circuits is an I2C interface circuit. The detection signal of the voltage detector 76 and that of the power detector 80 are input to the I/F circuit 84. The lamp 54 is connected to the bus line 100 via the I/F circuit 86. The input switch 56 is connected to the bus line 100 via the I/F circuit 88.

The ROM 96 stores a second picking support program. The second picking support program stores information indicating which goods are to be picked out by which worker and controls the display device 16 in accordance with the stored information. If the CPU 94 executes the second picking support program, the lamp 54 of one of the display devices 16 placed on the shelf for goods to be picked out by a worker, the color of which corresponds to the ID of the worker, is turned on. The name and number of the goods are displayed on the display 52 of the display device 16. The RAM 98 temporarily stores data that is being processed by the CPU 94.

The power receiving unit 62 may be built in the same housing as that of the display unit 64. The power receiving unit 62 may be located in a housing other than that of the display unit 64 and connected to the display unit 64 by wiring.

Figure 6:
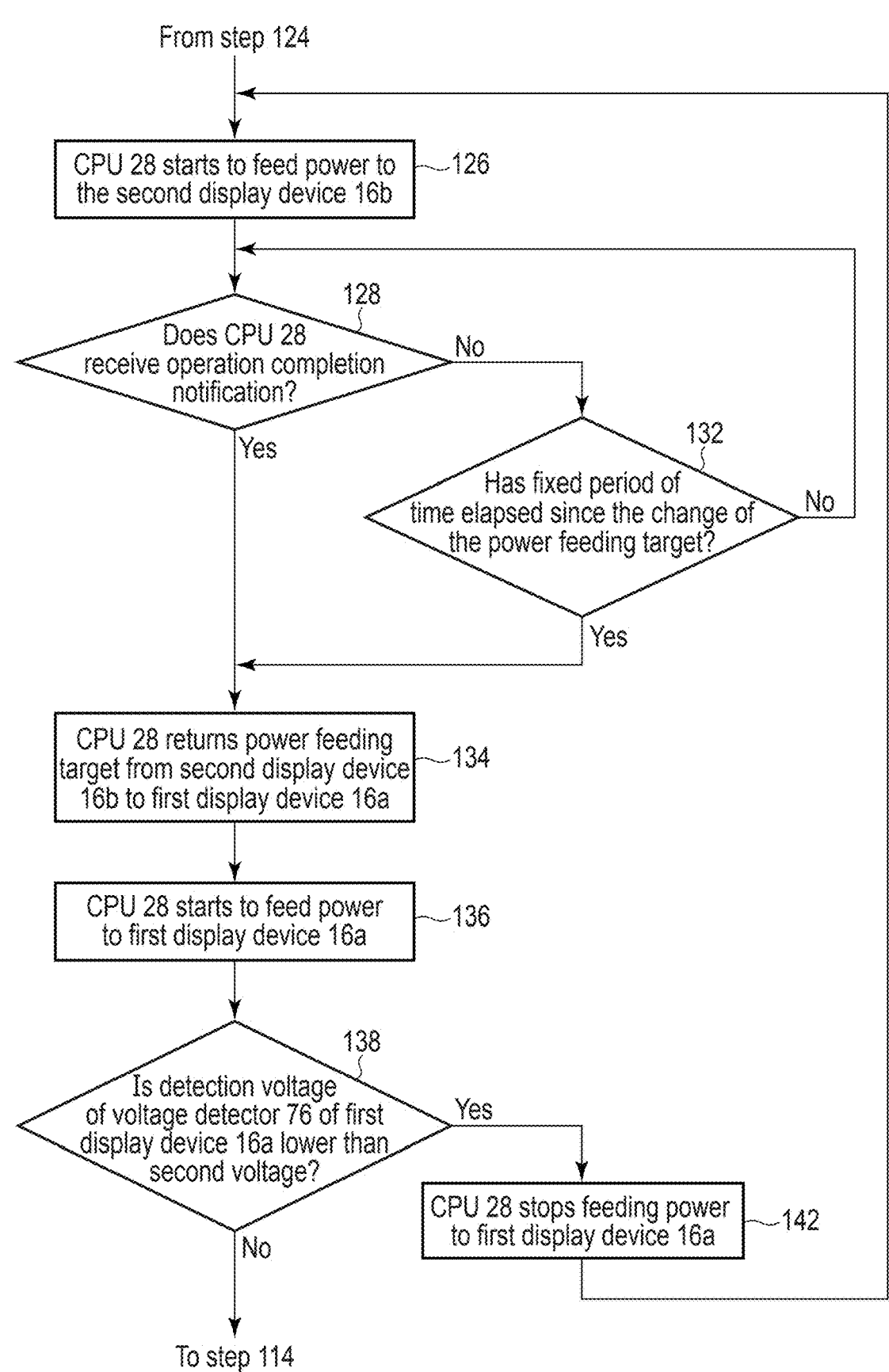
FIG. 6 shows a flowchart of the controller according to the first embodiment.

FIGS. 5 and 6 show a flowchart of the controller 10 illustrating an example of a power feeding method according to the first embodiment. The process of FIG. 5 is first performed and then that of FIG. 6 is performed.

In each of the display devices 16, the detection signals of the voltage detector 76 and power detector 80 are input to the CPU 94 via the I/F circuit 84 while the display device 16 is powered. The CPU 94 inputs the detection signals of the voltage detector 76 and power detector 80 to the transmitter/receiver 90. The transmitter/receiver 90 wirelessly transmits the detection signals of the voltage detector 76 and power detector 80 to the controller 10 via the transmitting/receiving antenna 92. The transmitter/receiver 90 may periodically transmit the detection signals of the voltage detector 76 and power detector 80 at regular intervals. Alternatively, the transmitter/receiver 90 may transmit the detection signals of the voltage detector 76 and power detector 80 when one of the detection signals becomes smaller than a prescribed value. Furthermore, the transmitting/receiving 90 may periodically transmit one of the detection signals of the voltage detector 76 and power detector 80. Alternatively, the transmitter/receiver 90 may transmit one of the detection signals of the voltage detector 76 and power detector 80 when the one of the detection signals becomes smaller than the prescribed value.

In the controller 10, the transmitter/receiver 24 receives the detection signals of the voltage detector 76 and power detector 80 from the display device 16 while the controller 10 is powered.

The controller 10 does not feed power to the display devices 16 simultaneously. The controller 10 feeds power to a single display device 16. The CPU 28 determines a power feeding target (step 112). An example of the power feeding target is one of the display devices 16 that has the smallest amount of remaining battery power (referred to as a first display device 16a). The CPU 28 may determine the amount of remaining battery power of the secondary battery 82 based on the detection signals of the voltage detector 76 and power detector 80 or based on at least one of the detection signals. The display device 16 may determine the amount of remaining battery power based on the output of the voltage detector 76 and/or the power detector 80 and transmit the amount of remaining battery power to the controller 10.

The CPU 28 starts to feed high-frequency power to the first display device 16a from the power feeding device 22, i.e., starts to feed power thereto (step 114). The CPU 28 controls the amount of phase shift of the phase shifter 44 to feed high-frequency power from the power feeding antenna 48 to the first display device 16a. If the power feeding antenna 48 is formed of a single antenna element, the CPU 28 drives a scanning mechanism (not shown) to orient the power feeding antenna 48 toward the first display device 16a. The power fed in step 114 is referred to as first power.

As described above, while the display device 16 is powered, the transmitter/receiver 90 transmits the detection signals of the voltage detector 76 and power detector 80 to the controller 10. In the controller 10, the transmitter/receiver 24 receives at least one of the detection signals of the voltage detector 76 and power detector 80 from the display device 16 while the controller is powered. In response to the received signal, the controller 10 can determine the power receiving level of the first display device 16a. For convenience of description, assume that in the flowchart, the controller 10 determines the power receiving level of the first display device 16a in response to the detection signal of the voltage detector 76.

The CPU 28 determines whether the detection voltage of the voltage detector 76 of the first display device 16a is lower than a first voltage (step 116). The first voltage is a value corresponding to the first power. The first voltage may be ½ to ¹⁄₁₀ of the voltage corresponding to the first power or ½ to ¹⁄₁₀ of the first power. One of the causes that the detection voltage of the voltage detector 76 is lower than the first voltage is that the power feeding beam to the first display device 16a is blocked by the worker. In step 116, based on the power receiving level of the first display device 16a, the CPU 28 determines whether the power feeding beam is blocked by the worker, that is, whether the worker is irradiated with electromagnetic waves.

If the detection voltage of the voltage detector 76 is not lower than the first voltage (No in step 116), the CPU 28 determines whether the detection voltage of the voltage detector 76 of the first display device 16a is equal to or higher than a third voltage (step 118). The third voltage corresponds to the output power of the rectifier 74 when the secondary battery 82 of the display device 16 is fully charged. That is, in step 118, the CPU 28 determines whether the secondary battery 82 has been completely charged.

If the detection voltage of the power detector 80 is not equal to or higher than the third voltage (No in step 118), the CPU 28 performs the determination process of step 116.

If the detection voltage of the voltage detector 76 is equal to or higher than the third voltage (Yes in step 118), the CPU 28 executes step 112 (determination of the power feeding target) and feeds power to another display device 16.

If the detection voltage of the voltage detector 76 is lower than the first voltage (Yes in step 116), the CPU 28 stops feeding power to the first display device 16a from the power feeding device 22 because the power feeding beam to the first display device 16a may be blocked by the worker (step 120).

If the power feeding is stopped, the efficiency of power feeding to a power feeding area (the entire shelf 12) decreases. Thus, the CPU 28 changes the power feeding target and continues the power feeding to a display device other than the display device 16a.

The CPU 28 sets an area 102 including the first display device 16a and its surrounding display devices 16 (referred to as an irradiation inhibition area) (step 122). The irradiation inhibition area 102 is an area viewed from the power feeding device 22 and including a worker.

FIGS. 7 and 8 are front views of the shelf 12 illustrating an example of the irradiation inhibition area 102 in the power feeding system according to the first embodiment. As shown in FIG. 7, an example of the irradiation inhibition area 102 includes the display devices 16 of seven rows and three columns centered on the first display device 16a.

If the first display device 16a is located at lower shelfs, the worker has to bend down to pick out the goods, and thus the size of the irradiation inhibition area 102 in the vertical direction decreases as shown in FIG. 8. An example of the irradiation inhibition area 102 shown in FIG. 8 includes the display devices 16 of five rows and three columns. More specifically, the five rows consist of one row including the first display device 16a, three upper rows, and one lower row, and the three columns consist of one column including the first display device 16a and two columns on both sides of the one column.

Returning to the flowchart, the CPU 28 changes the power feeding target to feed power to another display device (referred to as a second display device 16b) of the display devices 16 outside the irradiation inhibition area 102 (step 124). The CPU 28 may use, as the second display device 16b, the display device 16 having the smallest amount of remaining battery power in the display devices 16 outside the irradiation inhibition area 102. Alternatively, the CPU 28 may use, as the second display device 16b, the display device 16 farthest from the first display device 16a in the display devices 16 outside the irradiation inhibition area 102.

The CPU 28 starts to feed power to the second display device 16b from the power feeding device 22 (step 126). The power fed in step 126 is the first power.

It is assumed that a worker who is performing a picking operation does not stay in one place for a long time. The CPU 28 changes the power feeding target as a worker comes close to the power feeding target for picking (step 124). The amount of remaining battery power of the first display device 16a, which is the initial power feeding target, is small. Therefore, it may be preferable that the power feeding target is returned from the second display device 16b to the first display device 16a if the worker leaves the first display device 16a upon the completion of the picking from the container 14 at which the first display device 16a is located.

In the operation of the picking support system, it is recommended for a worker to operate the input switch 56 when the worker completes picking out the goods. When the input switch 56 is operated, an operation completion notification is transmitted to the controller 10. Therefore, in response to the operation completion notification from the first display device 16a, the power feeding target may be returned from the second display device 16b to the first display device 16a. It is also assumed that the picking operation is completed in a fixed period of time. Therefore, the power feeding target may be returned from the second display device 16b to the first display device 16a after a lapse of the fixed period of time from when the power feeding target is changed.

The CPU 28 determines whether the CPU 28 receives the operation completion notification from the first display device 16a (step 128).

If the CPU does not receive the operation completion notification from the first display device 16a (No in step 128), the CPU 28 determines whether the fixed period of time has elapsed since the change of the power feeding target (step 132). An example of the fixed period of time is several seconds to several tens of seconds. If the fixed period of time has not elapsed since the power feeding target is changed, the CPU 28 executes step 128 (determination whether the operation completion notification has been received). The fixed period of time may be determined on the basis of a rule of thumb. The fixed period of time may be determined by learning on the basis of the input timing of a work management notification and the work contents (type and number of goods) for each worker.

If the transmitter/receiver 24 receives the operation completion notification from the first display device 16a (Yes in step 128) or if the fixed period of time has elapsed since the power feeding target is changed (Yes in step 132), the CPU 28 stops feeding power to the second display device 16b and starts to feed power to the first display device 16a, that is, returns the power feeding target from the second display device 16b to the first display device 16a (step 134).

The CPU 28 starts to feed power to the first display device 16a from the power feeding device 22 (step 136). The power fed in step 136 is referred to as second power. The second power is lower than the first power (power fed in step 114). The reason for this is to reduce the damage to the worker's health when the worker is located close to the first display device 16a upon the completion of picking out the goods or when the worker is located close to the first display device 16a due to a delay in the picking operation even after the fixed period of time has elapsed since the power feeding target is changed.

The CPU 28 determines whether the detection voltage of the voltage detector 76 of the first display device 16a is lower than the second voltage (step 138). The second voltage is a value corresponding to the second power. The second voltage may be ½ to ⅒ of the voltage corresponding to the second power or ½ to ⅒ of the second power.

If the detection voltage of the voltage detector 76 is lower than the second voltage (Yes in step 138), the CPU 28 stops feeding power to the first display device 16a from the power feeding device 22 (step 142). After that, the CPU 28 starts to feed power to the second display device 16b from the power feeding device 22 (step 126). If, therefore, the worker is located close to the first display device 16a, the power feeding to the first display device 16a is stopped and the power feeding to the second display device 16b is resumed.

If the detection voltage of the voltage detector 76 is not lower than the second voltage (No in step 138), the CPU 28 starts to feed power to the first display device 16a from the power feeding device 22 (step 114). Thus, the power fed to the first display device 16a from the power feeding device 22 is returned from the second power to the first power.

In the power feeding system according to the first embodiment, if a worker is close to the first display device 16a (a power feeding target) during power feeding, a power feeding inhibition area is set to change the power feeding target to the second display device 16b other than the power feeding inhibition area. Thus, the secondary battery is charged with efficiency. It is possible to avoid irradiating the worker with electromagnetic waves and to prevent the secondary battery of the display device 16a as the power feeding target from running out of power.

In the power feeding system according to the first embodiment, a power feeding target is changed from the first display device 16a to the second display device 16b. The power feeding target is then returned to the first display device 16a in response to an operation completion notification or after a lapse of a fixed period of time. Therefore, the power feeding to the original power feeding target 16a is quickly resumed.

In the power feeding system according to the first embodiment, a power feeding target is returned again to the second display device 16b if a worker is close to the first display device 16a after the power feeding target is changed to the first display device 16a. Therefore, the possibility that the worker close to the first display device 16a will be irradiated with electromagnetic waves is further decreased.

In the power feeding system according to the first embodiment, it is determined whether a worker is close to a power feeding target based on the power receiving level (received voltage or received power) of the display device 16 as the power feeding target. It is therefore possible to determine whether a worker is present between the power feeding device 22 and the power feeding target without using a sensor, camera, or other devices.

Second Embodiment

The system configuration of the second embodiment is the same as that of the first embodiment. The second embodiment is the same as the first embodiment in the process up to changing a power feeding target from the first display device 16a to the second display device 16b (step 124) and starting to feed power to the second display device 16b (step 126). The second embodiment differs from the first embodiment in the process of returning a power feeding target from the second display device 16b to the first display device 16a.

FIGS. 9 and 10 show a flowchart of the controller 10 illustrating an example of a power feeding method according to the second embodiment. FIG. 9 corresponds to FIG. 5 (first embodiment). FIG. 10 corresponds to FIG. 6 (first embodiment). The process of FIG. 10 is performed after the process of FIG. 9.

In the second embodiment, as shown in FIG. 10, the CPU 28 starts power feeding to the second display device 16b (step 126). If the CPU 28 determines that an operation completion notification has not been received (No in step 128) and then the CPU 28 determines that a fixed period of time has elapsed since the power feeding target is changed (Yes in step 132), the CPU 28 counts the number of times that the fixed period of time has elapsed (step 152). The CPU 28 determines whether the counted number is equal to or larger than a particular number (step 154).

It is assumed in the second embodiment that the power receiving level of the first display device 16a is decreased by something other than the worker's pick-out operation. The power receiving level is decreased by obstacles other than workers between the power supply device 22 and the power feeding target. It is also decreased by trouble with the power supply device 22, trouble with the power receiving unit 62b of the display device 16b, a shift in orientation of the power receiving antenna 72, and the like. The decrease in the power receiving level due to the worker' pick-out operation is temporary. However, the decrease in the power receiving level due to causes other than the worker's pick-out operation is long-lasting or permanent.

If the counted number of times that the fixed period of time has elapsed since the power feeding target is changed is smaller than the particular number (No in step 154), it can be assumed that the power receiving level of the first display device 16a is decreased by the worker's pick-out operation. The CPU 28 returns the power feeding target from the second display device 16b to the first display device 16a in step 134.

If the counted number is equal to or larger than the particular number (Yes in step 154), it can be assumed that the power receiving level of the first display device 16a is decreased by something other than the worker's pick-out operation. The CPU 28 changes the first voltage to a lower voltage (step 156). Subsequent to step 156, the CPU 28 determines in step 116 whether the detection voltage of the voltage detector 76 of the first display device 16a is lower than the first voltage. Since the first voltage was lowered in step 156, the possibility (Yes) that the CPU 28 will determine in step 116 that the detection voltage of the voltage detector 76 of the first display device 16a is lower than the first voltage, is lowered. Accordingly, the possibility that the power feeding to the first display device 16a will be stopped in step 120, is lowered. Thus, the possibility that the power feeding to the first display device 16a will be interrupted, is lowered.

Instead of step 156, the CPU 28 may execute a step of notifying the manager of the picking support system of an alert indicating the possibility that an obstacle other than the worker will be present between the power feeding device 22 and the power feeding target, the possibility the power feeding device 22 and the power receiving unit 62b will be troubled, and the possibility that the orientation of the power receiving antenna 72 will be shifted. This notification allows the manager to take appropriate measures.

Third Embodiment

The system configuration of the third embodiment is the same as that of the first embodiment. In the first and second embodiments, the CPU determines whether a worker is close to a power feeding target, based on the power receiving level of the power feeding target. The power receiving level of the power feeding target is also lowered by trouble with the power feeding target. In the third embodiment, a decrease in power receiving level due to trouble of the power feeding target is distinguished from a decrease in power receiving level due to the presence of a worker close to the power feeding target.

FIG. 11 is a front view of the shelf 12 illustrating an example of the placement of the display devices 16 of a power feeding system according to the third embodiment. Seven containers 14 are placed on each stage (row) of the shelf 12. The shelf 12 has five rows and seven columns, and thirty-five display devices 16 are placed on the shelf 12. Assume that the power feeding target is the display device 16a in the fourth column of the third row. The power feeding device 22 controls the directivity of the power feeding antenna 48 and feeds the power feeding beam to the display device 16a. However, not only the display device 16a but also its surrounding eight display devices d1, d2, d3, d4, d5, d6, d7, and d8 (the eight display devices placed in the vertical direction, horizontal direction, and diagonal direction from the display device 16a) receive a part of the power feeding beam.

FIG. 12 is a graph illustrating an example of the power receiving level (received voltage or received power) of the display devices d1 to d4, 16a, and d5 to d8 when no worker is located in front of the shelf 12. In FIG. 12, blank bars indicate the received voltage, and hatched bars indicate the received power. The numerical values of the received voltage in the vertical axis are different from the numerical values of the received power in the vertical axis. The received voltage or received power of the display device 16a of the power feeding target is maximum. The received voltage or received power of the display devices d1 to d8 around the display device 16a gradually decreases in accordance with a distance between the power feeding target 16a and the display devices d1 to d8. This is because the charging voltage of the secondary battery 82 is generated in the first display device 16a of the power feeding target, but is almost not generated in the secondary batteries 82 of the other display devices. This is also because the conversion efficiency of the rectifier 74 or the DC-DC converter 78 is maximized at the rated power reception. Since the received voltage and the received power are correlated, the power receiving level of the display device 16 is determined based on the received voltage, in the embodiment.

FIG. 13 is a graph illustrating another example of the received voltage and received power of the display devices d1 to d4, 16a, and d5 to d8 when a worker is located in front of the shelf 12. Since the power feeding beams are blocked by the worker, the received voltage and received power of the display devices d1 to d4, 16a, and d5 to d8 are uniformly decreased compared to those in FIG. 12. The received voltage of the display devices d1 to d4, 16a, and d5 to d8 is lower than a first voltage V1.

FIG. 14 is a graph illustrating another example of the received voltage and received power of the display devices d1 to d4, 16a, and d5 to d8 when the display device 16a is troubled. The received voltages of the display devices d1 to d8 are the same as those shown in FIG. 12 and are equal to or higher than the first voltage V1. Due to the trouble of the display device 16a, the received voltage of the display device 16a is greatly decreased and is lower than the first voltage V1.

The controller 10 can discriminate between a state of FIG. 13 and a state of FIG. 14 based on the power receiving levels of the power feeding target and its surrounding display devices. Thus, the power feeding target can appropriately be changed based on the discrimination result.

FIG. 15 is a flowchart of the controller 10 illustrating an example of a power feeding method according to the third embodiment. FIG. 15 corresponds to FIG. 5 (first embodiment) or FIG. 9 (second embodiment). When the process shown in FIG. 15 is completed, the process shown in FIG. 6 (first embodiment) or FIG. 10 (second embodiment) is performed.

The third embodiment is the same as the first and second embodiments in the process up to the determination whether the detection voltage of the voltage detector 76 of the first display device 16a is lower than the first voltage (step 116) and the determination whether the detection voltage of the voltage detector 76 in the case of No in step 116 is equal to or higher than the third voltage (step 118). In the third embodiment, if the detection voltage of the voltage detector 76 is lower than the first voltage (Yes in step 116), the CPU 28 determines whether the detection voltages of the voltage detectors 76 of all (eight) display devices d1 to d8 close to the first display device 16a are lower than the first voltage (step 162).

If the detection voltages of the voltage detectors 76 of the display devices d1 to d8 are all lower than the first voltage, it is assumed as shown in FIG. 13 that the power receiving levels of the power feeding target 16a and its surrounding display devices d1 to d8 are decreased due to the presence of a worker close to the power feeding target 16a. The CPU 28 executes step 120 (stops feeding power to the first display device 16a).

If at least one of the detection voltages of the voltage detectors 76 of the display devices d1 to d8 is equal to or higher than the first voltage, it is assumed as shown in FIG. 14 that the power receiving level of the power feeding target 16a only has decreased due to trouble of the power feeding target 16a. Thus, in step 164, the CPU 28 notifies the manager of an alert indicating the possibility of trouble of the display device 16a, and terminates the process.

In the power feeding system according to the third embodiment, a decrease in the power receiving level caused by a worker in front of the display device 16a of a power feeding target can be distinguished from a decrease in the power receiving level caused by trouble of the display device 16a or the like. A false detection rate can be lowered and an alert of trouble or the like can be issued.

FIG. 16 is a flowchart of the controller 10 illustrating an example of a process of a modification to the third embodiment. In the modification, step 172 is executed instead of step 164 in FIG. 15. If at least one of the detection voltages of the voltage detectors 76 of the display devices d1 to d8 is equal to or higher than the first voltage (No in step 162), the CPU 28 changes the first voltage to a lower voltage at step 172. Next to step 172, the CPU 28 determines in step 116 whether the detection voltage of the voltage detector 76 of the first display device 16a is lower than the first voltage. Since the first voltage is lowered in step 172, the possibility (Yes) that the CPU 28 will determine that the detection voltage of the voltage detector 76 of the first display device 16a is lower than the first voltage in step 116, is lowered. Accordingly, the possibility that the power feeding to the first display device 16a will be stopped in step 120, is lowered. Thus, the possibility that the power feeding to the first display device 16a will be interrupted, is lowered.

Fourth Embodiment

The system configuration of the fourth embodiment is the same as that of the first embodiment. In the fourth embodiment, when the power feeding target is changed to the second display device 16b to start to feed power to the second display device 16b, the power fed to the second display device 16b is lowered to feed power to a third display device, based on the power receiving level of the display device 16 close to the irradiation inhibition area 102.

FIG. 17 is a front view of a shelf illustrating an example of the first and second display devices 16a and 16b according to the fourth embodiment. The original power feeding target is the first display device 16a, and the irradiation inhibition area 102 is set around the first display device 16a. The power feeding target is changed to the second display device 16b in an area other than the irradiation inhibition area 102.

FIG. 18 is a graph illustrating an example of the power receiving levels of the changed power feeding target 16b (also referred to as d11) and its surrounding eight display devices d12 to d19 according to the fourth embodiment. The power feeding device 22 controls the directivity of the power feeding antenna 48 to feed power feeding beams to the display device d11; however, not only the display device d11 but also its surrounding display devices d12 to d19 receive a part of the power feeding beam. The power receiving levels of the display devices d13, d16, and d19 adjacent to the irradiation inhibition area 102 are preferably small. If the power receiving levels of the display devices d13, d16, and d19 are equal to or higher than a certain level, the influence of electromagnetic waves upon a worker close to the first display device 16a is high. In the fourth embodiment, power is fed to avoid such an influence.

FIG. 19 is a flowchart of the controller 10 illustrating an example of a power feeding method according to the fourth embodiment. FIG. 19 corresponds to FIG. 6 (first embodiment) or FIG. 10 (second embodiment).

The CPU 28 changes a power feeding target (step 124 in FIG. 5 or FIG. 9) and starts to feed power to the second display device 16b (step 126). The CPU 28 determines whether the detection voltages of the voltage detectors 76 of all display devices 16 close to the irradiation inhibition area 102 are lower than a fourth voltage (step 182). In the example of FIG. 17, the CPU 28 determines whether all the detection voltages of the voltage detectors 76 of the display devices d13, d16, and d19 adjacent to the irradiation inhibition area 102 are lower than the fourth voltage. The fourth voltage may be a voltage that is in accordance with guidelines for protection from electromagnetic waves applied to the human body.

If the detection voltages of the voltage detectors 76 of all the display devices 16 close to the irradiation inhibition area 102 are lower than the fourth voltage (Yes in step 182), the CPU 28 can determine that the feeding of second power to the second display device 16b has no influence of electromagnetic waves upon workers close to the first display device 16a, and thus determines whether an operation completion notification has been received in step 128.

If the detection voltage of the voltage detector 76 of at least one of the display devices 16 close to the irradiation inhibition area 102 is equal to or higher than the fourth voltage (No in step 182), the CPU 28 can determine that the feeding of second power to the second display device 16b has influence of electromagnetic waves upon workers close to the first display device 16a, and thus continues feeding power to the second display device 16b with decreasing the feeding power (step 184). The CPU 28 then executes the determination of step 182.

In the case of No in step 182, the CPU 28 may execute step 124 instead of step 184 to change the power feeding target to the third display device 16.

The power feeding system according to the fourth embodiment can prevent an area where workers exist (irradiation inhibition area) from being irradiated with electromagnetic waves exceeding the protection guidelines when the power feeding target is changed to the second display device 16b.

Fifth Embodiment

The system configuration of the fifth embodiment is the same as that of the first embodiment.

FIG. 20 is a flowchart of the controller 10 illustrating an example of a power feeding method according to the fifth embodiment. FIG. 20 corresponds to FIG. 5 (first embodiment), FIG. 9 (second embodiment), or FIG. 15 (third embodiment). The process shown in FIG. 20 is performed and then the process shown in FIG. 6 (first embodiment) or FIG. 10 (second embodiment) is performed.

The fifth embodiment is the same as the first and second embodiments in the process up to the determination whether the detection voltage of the voltage detector 76 of the first display device 16a is lower than the first voltage (step 116) and the determination whether the detection voltage of the voltage detector 76 in the case of No in step 116 is equal to or higher than the third voltage (step 118). In the fifth embodiment, if the detection voltage of the voltage detector 76 is lower than the first voltage (Yes in step 116), the CPU 28 determines whether the display 52 of the display device 16a displays pickup support information (name and number of goods) (step 192). The determination in step 192 is determination whether the first display device 16a is a display device placed in the container 14 related to the pickup operation. Even if the power receiving level of the display device 16 of the power feeding target decreases, the power feeding may be continued as long as the display device 16 is one not related to the pickup operation. If the display 52 of the display device 16a does not display the pickup support information (No in step 192), the CPU 28 execute step 116. If the display 52 of the display device 16a displays the pickup support information (Yes in step 192), the CPU 28 stops feeding power to the first display device 16a (Step 120).

In the power feeding system according to the fifth embodiment, even though the power feeding level of the first display device 16a of a power feeding target decreases, the power feeding target is changed only when the first display device 16a displays the pickup support information. Thus, a worker who stays in front of the first display device 16a can be distinguished from a worker who simply passes in front of the first display device 16a, and human body error detection can be avoided. Even though a worker simply passes in front of the first display device 16a and thus the power receiving level decreases, the power feeding target is not changed, and the power feeding to the first display device 16a is continued.

Sixth Embodiment

The system configuration of the sixth embodiment is the same as that of the first embodiment.

FIG. 21 is a flowchart of the controller 10 illustrating an example of a power feeding method according to the sixth embodiment. FIG. 21 corresponds to FIG. 6 (first embodiment) and FIG. 10 (second embodiment).

In the sixth embodiment, power feeding to the second display device 16b is started (step 126). If the CPU 28 does not determine that an operation completion notification is received (No in step 128) and it does not determine that a fixed period of time has elapsed since the power feeding target is changed (No in step 132), it determines whether the detection voltage of the voltage detector 76 of the first display device 16a is equal to or higher than a fifth voltage (step 202). The fifth voltage is a voltage capable of determining that the detection voltage of the voltage detector 76 of the first display device 16a, which has decreased due to the presence of a worker, has increased because the worker has left. The fifth voltage may be equal to the first voltage for use in determination in step 116.

If the detection voltage of the voltage detector 76 of the first display device 16a is lower than the fifth voltage (No in step 202), the CPU 28 executes step 128 (determines whether an operation completion notification is received).

If the detection voltage of the voltage detector 76 of the first display device 16a is equal to or higher than the fifth voltage (Yes in step 202), the CPU 28 executes step 134 and returns the power feeding target from the second display device 16b to the first display device 16a.

In the power feeding system according to the sixth embodiment, the CPU 28 changes the power feeding target from the first display device 16a to the second display device 16b and then determines whether a worker has left the first display device 16a based on the detection voltage of the voltage detector 76 of the first display device 16a. The CPU 28 determines that the worker has left the first display device 16a even though the worker forgets to press the input switch 56 at the time of completion of the operation and does not receive an operation completion notification. The CPU 28 determines that the worker has left the first display device 16a even though the elapsed time from the change of the power feeding target is equal to or shorter than a fixed period of time. The CPU 28 returns the power feeding target from the second display device 16b to the first display device 16a if it determines that the worker has left the first display device 16a. Therefore, the first display device 16a of the original power feeding target is quickly charged.

Although the first to sixth embodiments have been described as individual embodiments, two or more embodiments may be combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A power feeding system comprising:
power receiving units configured to receive electromagnetic waves, the power receiving units comprising a first power receiving unit and a second power receiving unit;
communication units corresponding to the power receiving units; and
a power feeding unit configured to feed power to the first power receiving unit via the electromagnetic waves,
wherein:
the communication units include a first communication unit corresponding to the first power receiving unit and a second communication unit corresponding to the second power receiving unit,
after the power feeding unit feeds the power to the first power receiving unit via the electromagnetic waves, the first communication unit is configured to transmit reception information representing a receiving level of the first power receiving unit to the power feeding unit,
after the power feeding unit feeds the power to the second power receiving unit via the electromagnetic waves, the second communication unit is configured to transmit reception information representing a receiving level of the second power receiving unit to the power feeding unit, and
when the receiving level of the first power receiving unit is lower than a first reference value and the receiving level of the second power receiving unit decreases in accordance with a distance between the second power receiving unit and the first power receiving unit, the power feeding unit is configured to decrease the first reference value or issue an alarm.

2. The power feeding system of claim 1, wherein;
the power feeding unit is configured to stop feeding power to the second power receiving unit after a fixed period of time after stopping feeding power to the first power receiving unit, and
the power feeding unit is configured to resume feeding power to the first power receiving unit.

3. The power feeding system of claim 2, wherein;
the power feeding unit is configured to count a number of times that the fixed period of time has elapsed since stopping feeding power to the first power receiving unit, and
the power feeding unit is configured to decrease the first reference value when the number of times is equal to or larger than a particular number of times.

4. The power feeding system of claim 3, wherein the power feeding unit is configured to issue the alarm when the number of times is equal to or larger than the particular number of times.

5. The power feeding system of claim 3, wherein:
the power feeding unit is configured to stop feeding power to the second power receiving unit when the number of times is smaller than the particular number of times, and
the power feeding unit is configured to resume feeding power to the first power receiving unit.

6. The power feeding system of claim 1, further comprising input units corresponding to the receiving units,
wherein:
the input units include a first input unit corresponding to the first power receiving unit,
the power feeding unit is configured to stop feeding power to the second power receiving unit when the power feeding unit receives an input from the first input unit, and
the power feeding unit is configured to resume feeding power to the first power receiving unit.

7. The power feeding system of claim 1, wherein:
the power feeding unit is configured to feed power of a first level to the first power receiving unit, and stop feeding power of the first level to the first power receiving unit,
the power feeding unit is configured to stop feeding power of the first level to the first power receiving unit when the receiving level of the first power receiving unit is lower than the first reference value, and
the power feeding unit is configured to feed power of the first level to the second power receiving unit, stop feeding power of the first level to the second power receiving unit, and feed power of a level that is lower than the first level to the first power receiving unit.

8. The power feeding system of claim 7, wherein the power feeding unit is configured to return the level of power fed to the first power receiving unit to the first level when the receiving level of the first power receiving unit is lower than a second reference value after feeding power of the level that is lower than the first level to the first power receiving unit.

9. The power feeding system of claim 1, wherein:
the power feeding unit is configured to stop feeding power to the first power receiving unit when the receiving level of the first power receiving unit is lower than the first reference value and all of receiving levels of a part of the power receiving units around the first power receiving unit are lower than the first reference value, the power feeding unit is configured to feed power to the second power receiving unit, the power feeding unit is configured to stop feeding power to the second power receiving unit, and the power feeding unit is configured to resume feeding power to the first power receiving unit.

10. The power feeding system of claim 9, wherein when the receiving level of the first power receiving unit is lower than the first reference value and at least one of the receiving levels of the part of the power receiving units is lower than the first reference value, the power feeding unit is configured to decrease the first reference value or issue an alarm.

11. The power feeding system of claim 1, wherein:

the power receiving units are arranged two-dimensionally, the second power receiving unit is one of the power receiving units located outside a particular area including the first power receiving unit, and a part of the power receiving units are arranged two-dimensionally inside the particular area.

12. The power feeding system of claim 11, wherein:

the power feeding unit is configured to feed power to the second power receiving unit, and the power feeding unit is configured decrease a level of power fed to the first power receiving unit when receiving levels of a part of the power receiving units close to the particular area are not lower than a second reference value.

13. The power feeding system of claim 1, further comprising display devices configured to display information corresponding to the power receiving units, wherein:

the display devices are configured to operate on power received by the power receiving units, the power feeding unit is configured to stop feeding power to the first power receiving unit when the receiving level of the first power receiving unit is lower than the first reference value and a display device corresponding to the first power receiving unit displays an instruction to a worker, and the power feeding unit is configured to transmit power to the second power receiving unit.

14. The power feeding system of claim 1, further comprising input units corresponding to the power receiving units, wherein:

the power feeding unit is configured to stop feeding power to the first power receiving unit when the receiving level is lower than the first reference value, the power feeding unit is configured to feed power to the second power receiving unit, the power feeding unit is configured to stop feeding power to the second power receiving unit when a fixed period of time has elapsed after starting feeding power to the second power receiving unit, when a first input unit corresponding to the first power receiving unit performs an input operation, or when the receiving level is equal to or higher than a second reference value, and the power feeding unit is configured to resume feeding power to the first power receiving unit.

15. The power feeding system of claim 1, wherein the alarm comprises information indicative of a possibility of trouble with the first power receiving unit.

16. A power feeding apparatus configured to feed power to a first power receiving unit and a second power receiving unit from among plural power receiving units via electromagnetic waves, wherein the power feeding apparatus is configured to:

receive reception information representing a receiving level of the first power receiving unit from a first communication unit corresponding to the first power receiving unit after the power is fed to the first power receiving unit;

receive reception information representing a receiving level of the second power receiving unit from a second communication unit corresponding to the second power receiving unit after the power is fed to the second power receiving unit; and when the receiving level of the first power receiving unit is lower than a first reference value and the receiving level of the second power receiving unit decreases in accordance with a distance between the second power receiving unit and the first power receiving unit, the power feeding unit is configured to decrease the first reference value or issue an alarm.

17. A power feeding method configured to feed power to a first power receiving unit and a second power receiving unit from among plural power receiving units via electromagnetic waves, the method comprising:

receiving reception information representing a receiving level of the first power receiving unit from a first communication unit corresponding to the first power receiving unit after the power is fed to the first power receiving unit;

receiving reception information representing a receiving level of the second power receiving unit from a second communication unit corresponding to the second power receiving unit after the power is fed to the second power receiving unit; and when the receiving level of the first power receiving unit is lower than a first reference value and the receiving level of the second power receiving unit decreases in accordance with a distance between the second power receiving unit and the first power receiving unit, the power feeding unit is configured to decrease the first reference value or issue an alarm.

18. A non-transitory computer readable storage medium having stored a computer program stored thereon, the computer program being executable by a computer to control the computer to execute functions comprising:

receiving reception information representing a receiving level of the first power receiving unit from a first communication unit corresponding to the first power receiving unit after the power is fed to the first power receiving unit;

receiving reception information representing a receiving level of the second power receiving unit from a second communication unit corresponding to the second power receiving unit after the power is fed to the second power receiving unit; and when the receiving level of the first power receiving unit is lower than a first reference value and the receiving level of the second power receiving unit decreases in accordance with a distance between the second power receiving unit and the first power receiving unit, the power feeding unit is configured to decrease the first reference value or issue an alarm.

19. A power feeding system comprising:

power receiving units configured to receive electromagnetic waves;

communication units corresponding to the power receiving units; and a power feeding unit configured to feed power to a first power receiving unit included in the power receiving units via the electromagnetic waves, wherein:

the first power receiving unit comprises a secondary battery, the communication units include a first communication unit corresponding to the first power receiving unit, the first communication unit is configured to transmit reception information representing a receiving level of the first power receiving unit to the power feeding unit, and the power feeding unit is configured to stop feeding power to the first power receiving unit and start feeding power to a third power receiving unit different from the first power receiving unit when the receiving level of the first power receiving unit is lower than a first reference value and the receiving level of the first power receiving unit is equal to or higher than a third reference value indicating that the secondary battery is fully charged.

\* \* \* \* \*